United States Patent
Songer et al.

(10) Patent No.: US 10,647,310 B2
(45) Date of Patent: May 12, 2020

(54) TRAINLINE SUPPORT ASSEMBLY

(71) Applicant: TTX Company, Chicago, IL (US)

(72) Inventors: Keith Songer, La Porte, IN (US); Joseph M. Hettinger, Downers Grove, IL (US); Jason H. Rounds, Chicago, IL (US); Jason Reiling, Hillsborough, NJ (US); Jennifer Mak, Bridgewater, NJ (US); Andres Montoya, South Plainfield, NJ (US); George Vermesi, Monroe, WA (US); Chris Munn, Fords, NJ (US)

(73) Assignee: TTX Company, Chicago, IL (US)

( * ) Notice: Subject to any disclaimer, the term of this patent is extended or adjusted under 35 U.S.C. 154(b) by 346 days.

(21) Appl. No.: 15/664,944

(22) Filed: Jul. 31, 2017

(65) Prior Publication Data

US 2019/0031213 A1    Jan. 31, 2019

(51) Int. Cl.
*B60T 17/04* (2006.01)
*B61G 5/08* (2006.01)

(52) U.S. Cl.
CPC .............. *B60T 17/046* (2013.01); *B61G 5/08* (2013.01)

(58) Field of Classification Search
CPC ........... B61G 5/06; B61G 5/08; B60T 17/043; B60T 17/046
USPC ............................................. 248/53; 213/76
See application file for complete search history.

(56) References Cited

U.S. PATENT DOCUMENTS

| 743,796 | A | 11/1903 | Allan |
|---|---|---|---|
| 1,127,584 | A | 2/1915 | Brown |
| 1,263,574 | A | 4/1918 | Leftwich |
| 1,710,458 | A | 4/1929 | Robinson |
| 1,773,264 | A | 8/1930 | Gilroy |
| 1,800,660 | A | 4/1931 | Robinson |
| 1,826,288 | A | 10/1931 | Robinson |
| 1,891,659 | A | 12/1932 | Tomlinson |
| 1,896,687 | A | 2/1933 | Johnson |
| 1,901,917 | A | 3/1933 | McCune |
| 1,920,277 | A | 8/1933 | Robinson |
| 1,925,724 | A | 9/1933 | Robinson |
| 1,990,652 | A | 2/1935 | Johnson |
| 2,165,330 | A | 7/1939 | Bazeley |
| 2,179,854 | A | 11/1939 | Latham et al. |
| 2,296,170 | A | 9/1942 | Lockhart |
| 2,302,129 | A | 11/1942 | Gair |
| 2,536,671 | A | 1/1951 | Travers |
| 2,667,977 | A | 2/1954 | Kayler |
| 2,677,472 | A | 5/1954 | Larsson |

(Continued)

FOREIGN PATENT DOCUMENTS

IN    D0125MU2011    8/2012

OTHER PUBLICATIONS

Bentley, John, "An Introduction to Train Brakes", retrieved from internet Jul. 10, 2017, URL: http://www.tarorigin.com/art/Jbentley, 6pp.

(Continued)

*Primary Examiner* — Zachary L Kuhfuss
(74) *Attorney, Agent, or Firm* — Banner & Witcoff, Ltd.

(57) ABSTRACT

An end hose support assembly for a rail car is disclosed. The end hose support assembly may include a rear support bracket configured to be removably engaged within a yoke and the support assembly may constrain the lateral and vertical movement of a portion of the trainline.

45 Claims, 21 Drawing Sheets

SECTION B:B

(56) References Cited

U.S. PATENT DOCUMENTS

| | | | |
|---|---|---|---|
| 2,713,948 A | 7/1955 | Kell et al. | |
| 2,834,481 A | 5/1958 | Marsh et al. | |
| 2,934,217 A | 4/1960 | Simmons et al. | |
| 2,978,217 A | 4/1961 | Gunderson | |
| 3,312,481 A | 4/1967 | Temple | |
| 3,344,935 A | 10/1967 | Stewart et al. | |
| 3,381,977 A | 5/1968 | Metzger | |
| 3,424,415 A | 1/1969 | Nadherny | |
| 3,446,364 A | 5/1969 | Terlecky | |
| 3,552,580 A | 1/1971 | Cope | |
| 3,567,041 A | 3/1971 | Seay | |
| 3,587,868 A | 6/1971 | Yates | |
| 3,589,530 A | 6/1971 | Metzger | |
| 3,591,017 A | 7/1971 | Cope et al. | |
| 3,592,425 A | 7/1971 | Randolph et al. | |
| 3,599,665 A | 8/1971 | Dwyer, Jr. | |
| 3,730,561 A | 5/1973 | Temple et al. | |
| 3,802,578 A | 4/1974 | Farnworth | |
| 3,892,431 A | 7/1975 | Booth | |
| 3,941,254 A | 3/1976 | Sweger | |
| 4,015,720 A | 4/1977 | Peche | |
| 4,069,836 A | 1/1978 | Sowinski | |
| 4,071,148 A | 1/1978 | Tibbs | |
| 4,301,932 A | 11/1981 | Altherr | |
| 4,402,534 A | 9/1983 | Keenan | |
| 4,669,391 A | 6/1987 | Wicks et al. | |
| 4,813,555 A | 3/1989 | Cripe et al. | |
| 4,986,500 A | 1/1991 | Campbell | |
| 5,560,583 A | 10/1996 | Holmgren | |
| 6,290,079 B1 | 9/2001 | Altherr | |
| 6,422,521 B1 | 7/2002 | Tinklepaugh et al. | |
| 6,568,649 B1 | 5/2003 | Schmitt | |
| 6,581,791 B2 | 6/2003 | Flint et al. | |
| 6,776,299 B1 | 8/2004 | Trescott | |
| 6,968,788 B1 * | 11/2005 | Coslovi | B61D 3/184 105/355 |
| 7,070,062 B2 | 7/2006 | Trescott | |
| 7,267,306 B2 | 9/2007 | Eason et al. | |
| D559,084 S | 1/2008 | Foxx et al. | |
| D583,652 S | 12/2008 | Vermesi et al. | |
| 7,461,869 B2 | 12/2008 | Sommerfeld | |
| 7,467,812 B2 | 12/2008 | Ring et al. | |
| 7,631,774 B2 | 12/2009 | Foxx et al. | |
| 7,637,381 B2 | 12/2009 | Foxx et al. | |
| 7,748,549 B1 | 7/2010 | Browning | |
| 7,757,995 B2 | 7/2010 | McKieman | |
| 7,780,022 B2 | 8/2010 | Vermesi et al. | |
| D625,661 S | 10/2010 | Vermesi et al. | |
| 7,850,128 B2 | 12/2010 | Murphy | |
| 8,201,779 B2 | 6/2012 | Hua et al. | |
| 8,276,853 B2 | 10/2012 | Murphy | |
| 8,950,606 B2 | 2/2015 | Dunham | |
| 9,114,815 B2 | 8/2015 | Brodie | |
| 9,365,220 B2 | 6/2016 | Miner et al. | |
| 9,598,092 B2 | 3/2017 | James et al. | |
| 9,625,060 B2 | 4/2017 | Maki | |
| 9,694,832 B2 | 7/2017 | Foxx et al. | |
| 2004/0155005 A1 | 8/2004 | Murphy | |
| 2012/0068437 A1 | 3/2012 | Kobert et al. | |
| 2013/0221166 A1 | 8/2013 | Henniges et al. | |
| 2014/0284297 A1 | 9/2014 | Peckham et al. | |

OTHER PUBLICATIONS

"Update 2: North American Railcar Corporation Announces High Performance Magnalock Brake Lines", retrieved from Internet Jul. 10, 2017, URL: https://www.pwrs.ca/announcements/view.php?ID=7440, 6 pp.

"Trains-021509", (Thundertrain.org), retrieved from Internet Jul. 10, 2017, URL: http://thundertrain.org/trains-021509.html, 10 pp.

"Slip Coaches—Dividing Express Trains At Speed", retrieved from Internet Jul. 10, 2017, URL: http://mikes.railhistory.railfan.net/r134.html, 7 pp.

"Resilient Air Brake Hose Support", retrieved from Internet Jul. 10, 2017, URL: http://pennsy.com/product/resilient-air-brake-hose-support, 5 pp.

"Brackets for F-Shank Couplers", retrieved from Internet Jul. 10, 2017, URL: http://www.stratoinc.com/end-car-components/brackets-f-shank-couplers, 3 pp.

* cited by examiner

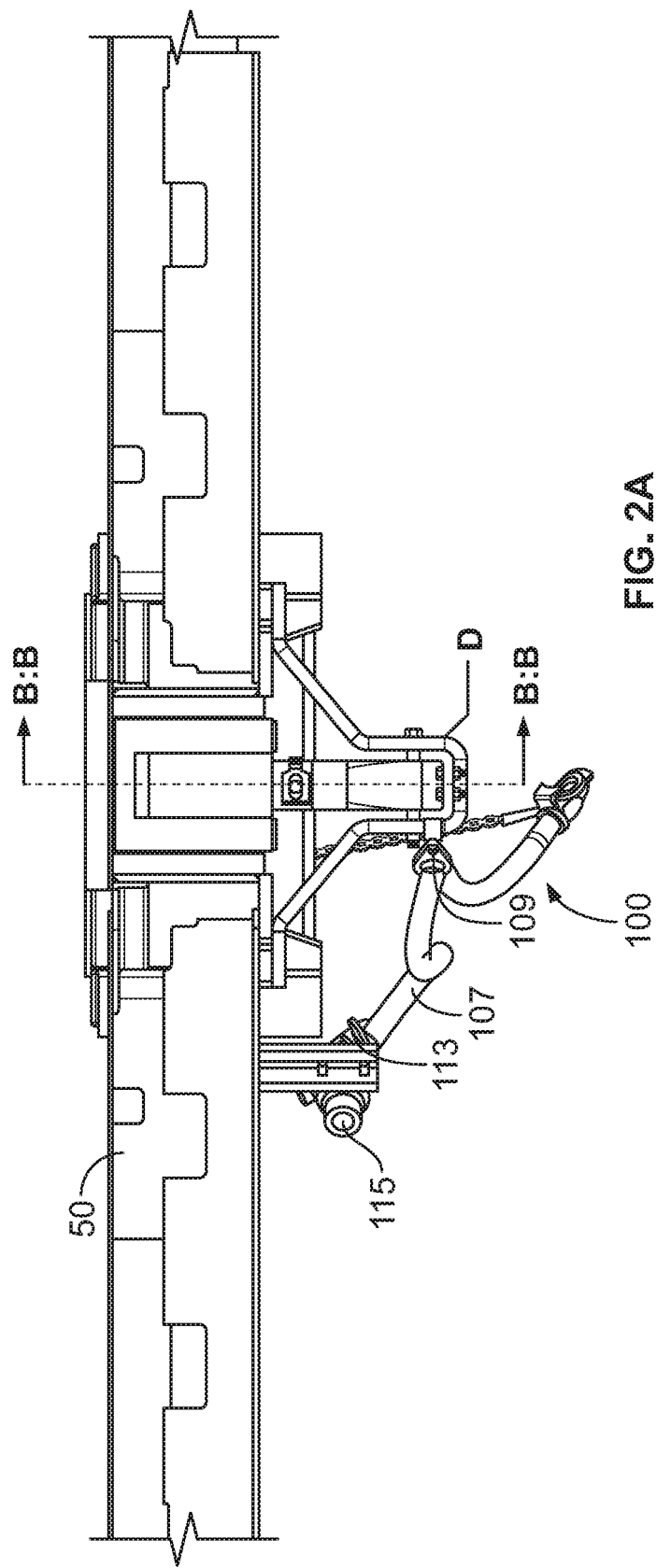

SECTION B:B

DETAIL C

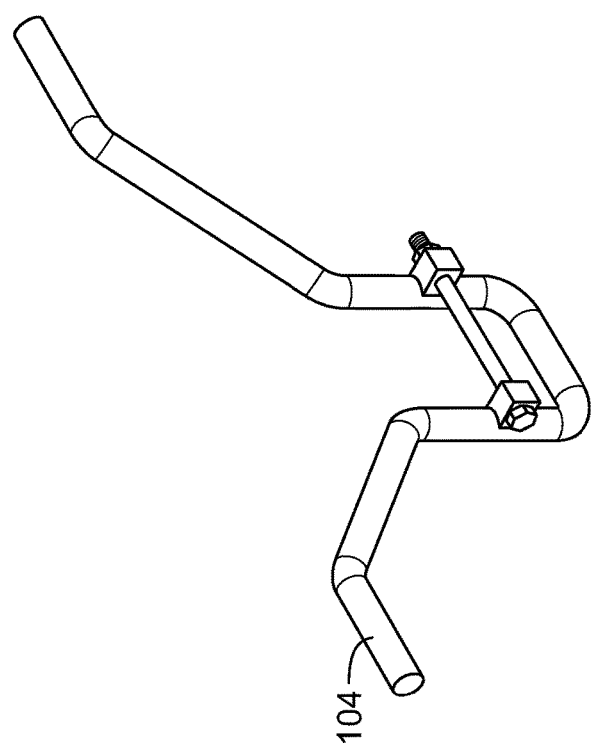
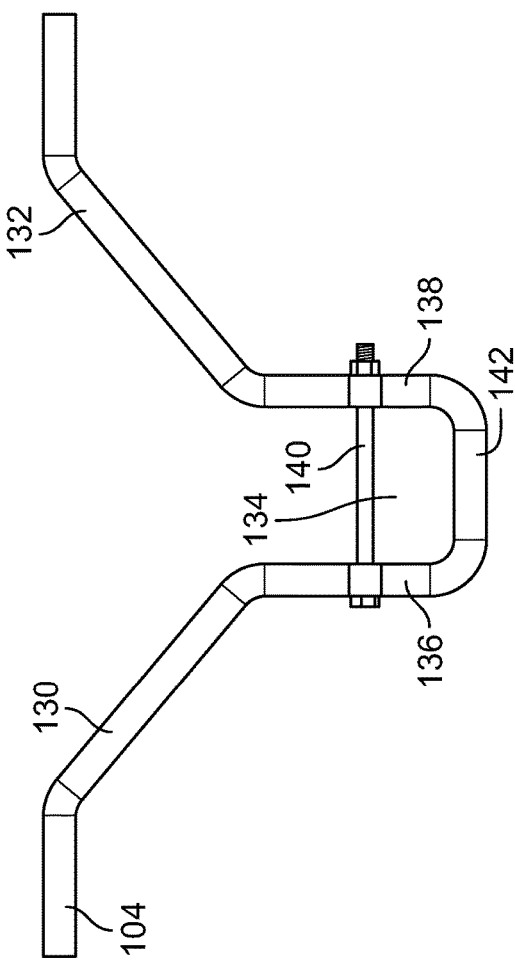
FIG. 5A
FIG. 5B

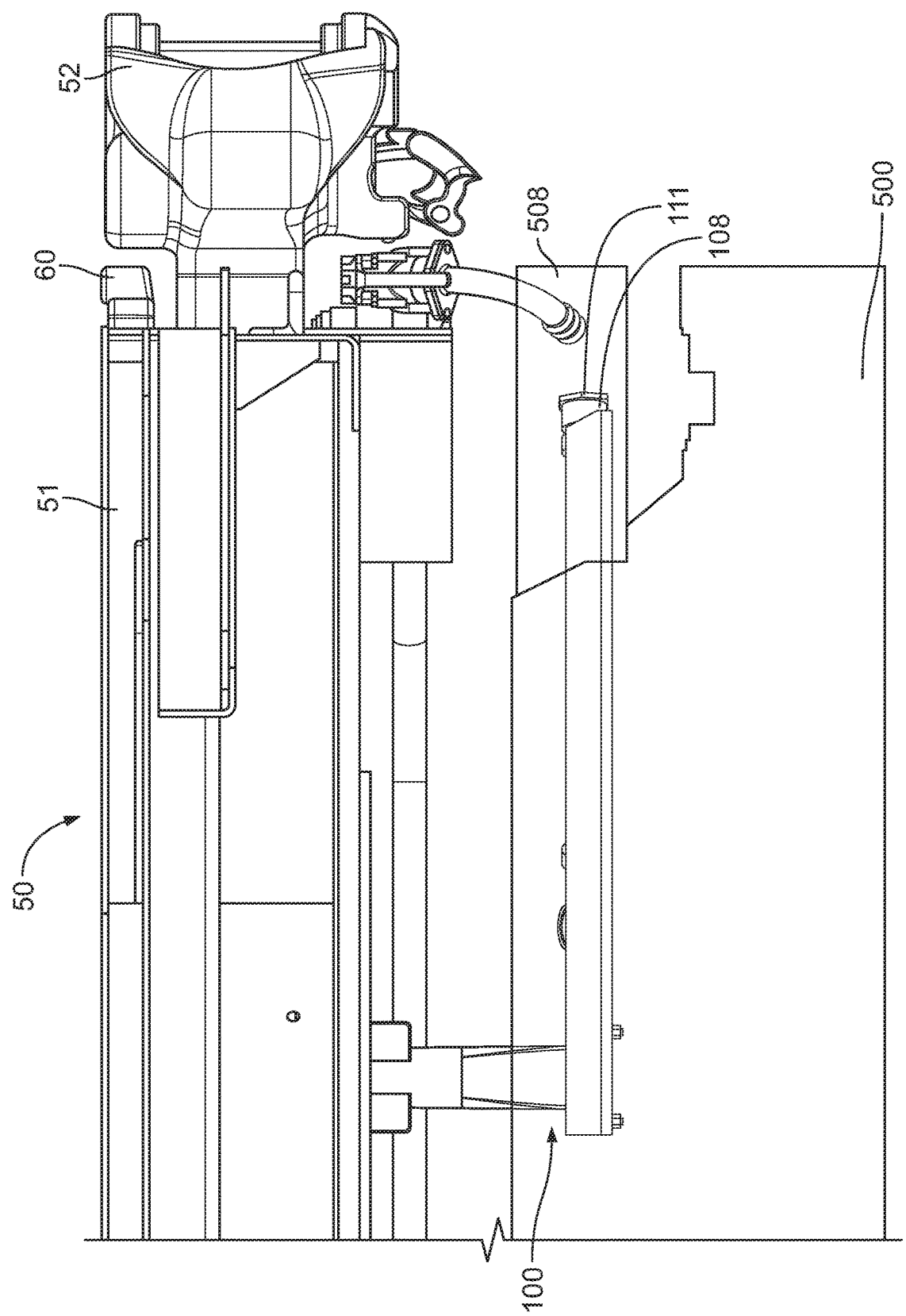

TRAINLINE SUPPORT ASSEMBLY

BACKGROUND

Modern rail cars generally include a brake system line, commonly known as a trainline, extending between each of the cars. The trainline is filled with compressed gas and is used to brake the train. The trainline generally consists of multiple parts including flexible hoses and rigid pipes connected between each adjacent car of train at a glad hand. This system of connected hoses/pipes is necessary to allow the train, including the trainline, to negotiate turns and otherwise travel down a track.

However, during operation of a train, many forces, often violent forces, affect the trainline; and these forces can affect the trainline from any direction, including laterally, vertically, and longitudinally. These forces can sometimes result in unintended trainline uncouplings at the gland hands which causes the train air brake system to apply the brakes on every car in the entire train. This causes the train to stop and may require that other trains on the same line also stop. Each minute trains are stopped can have a significant financial effect.

Thus, there is a need for an improved rail car air brake end hose support assembly, which may reduce unintended trainline uncouplings and/or may increase the reliability of rail car air brake end hose arrangements.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to one aspect, a rail car air brake end hose support assembly is disclosed. According to another aspect, a method for installing a rail car air brake end hose support assembly. According to another aspect, a method for installing a rail car Y-47 pin in rail car According to another aspect, a rail car air brake end hose support assembly is disclosed. The rail car air brake end hose support assembly may include a rigid, metallic rear support bracket having a top end and a bottom end, the rear support bracket removably, rigidly engaged at a top end within a yoke, the rear support bracket directly supporting a Y-47 pin, the rear support extends upward into a Y-47 pin hole surrounded by the yoke lugs and the rear support bracket extends below the yoke; a coupler pivotally engaged with the yoke about the Y-47 pin; a rigid, metallic front support bracket engaged with an underside of a rail car, the front support bracket having a tray opening formed by a first side restraining wall, a second side restraining wall, an upper restraining wall, and a lower restraining wall; a fixed length, rigid, metallic tray configured to support a rail car air brake end hose, the tray having a first side wall, a second side wall, and a lower wall connecting the first and second side walls and engaged with the lower restraining wall, the tray engaged with the bottom end of the rear support, and the tray movably engaged within the tray opening; and a portion of a trainline the portion of the trainline having a first connection point and a second connection point, wherein the portion of the trainline is rigidly engaged with the tray, wherein the first connection point and the second connection point are rigidly engaged with the tray, and wherein the portion of the trainline passes through the tray opening. The portion of a the trainline is engaged with an intermediate flexible hose at the first connection point, wherein intermediate flexible hose is engaged with an angle cock, and wherein the angle cock is substantially longitudinally aligned with an end sill. The portion of a the trainline is engaged with the rail car air brake end hose at the second connection point, and wherein the rail car air brake end hose is engaged with a glad hand; wherein the first side restraining wall and the second side restraining wall are configured to restrict lateral movement of the tray within the tray opening to less than or equal to 1 inch of lateral movement. The lateral movement of the coupler is substantially independent of lateral movement of the tray. The top restraining wall and the bottom restraining wall are configured to restrict vertical motion of the tray within the tray opening to less than or equal to 1 inch of vertical movement. The tray is configured to move longitudinally within the tray opening; and the longitudinal movement of the tray is substantially similar to the longitudinal movement of the Y-47 pin of the rail car.

The rear support bracket may have a substantially cylindrical cross-section at the top end and a substantially rectangular cross-section at the bottom end. The tray may be removably engaged with the bottom end of the rear support using mechanical fasteners. The portion of the trainline may be substantially rigid. The portion of the trainline may be engaged with the tray using mechanical fasteners.

According to another aspect, a rail car air brake end hose support assembly is disclosed. The rail car air brake end hose support assembly may include a rear support bracket having a top end and a bottom end, the rear support bracket may be configured to be removably, rigidly engaged at a top end within a yoke; and a substantially rigid portion of a trainline, the portion of the trainline engaged with the rear support bracket. The lateral movement of the portion of the trainline is constrained, the vertical movement of the portion trainline is constrained; and the portion of the trainline is configured to move longitudinally substantially similar to the longitudinal movement of a Y-47 pin of a rail car.

The rear support bracket may be rigid. The rear support bracket may be metallic. The rear support bracket may be configured to support the Y-47 pin.

The rail car air brake end hose support assembly may include a front support bracket engaged with an underside of the rail car, the front support bracket supporting the portion of the trainline. The front support bracket may be rigid. The front support bracket may be metallic. The front support bracket may be adjustable. The front support bracket may include an opening, and the portion of the trainline may extend through the opening. The opening is formed by a first side restraining wall, a second side restraining wall, an upper restraining wall, and a lower restraining wall; the first side restraining wall and the second side restraining wall are configured to restrain the lateral movement of the portion of the trainline; and the upper restraining wall, and a lower restraining wall are configured to restrain the vertical movement of the portion of the trainline. The rail car air brake end hose support assembly may also include a tray, the tray supporting the portion of the trainline; and the tray may be movably engaged within the opening.

The rail car air brake end hose support assembly may also include a tray, the tray supporting the portion of the trainline. The tray may be engaged with the bottom end of the rear support, and the portion of the trainline may be engaged with the rear support bracket through the tray. The tray may be removably engaged with the bottom end of the rear support using mechanical fasteners. The tray has a first side wall, a second side wall, and a lower wall connecting the first and second side walls and the lower wall engaged with the lower restraining wall of the front support bracket.

The lateral movement of the portion of the trainline may be restricted to less than 2 inches of movement. The vertical movement of the portion of the trainline may be restricted to less than 2 inches of movement.

The rear support bracket may have a substantially cylindrical cross-section at the top end and a substantially rectangular cross-section at the bottom end.

The portion of a trainline may be engaged with the rail car air brake end hose and the rail car air brake end hose is engaged with glad hand, and the coupler may be pivotally engaged with the yoke about the Y-47 pin.

According to another aspect, a method for installing a rail car air brake end hose support assembly is disclosed. The method includes providing a Y-47 pin having a top end and a bottom end, the Y-47 pin configured to be inserted into a rail car yoke; providing a rigid, metallic rear support bracket having a top end and a bottom end, the rear support bracket forming a portion of a rail car air brake end hose support assembly; inserting the Y-47 pin into the yoke; engaging the top end of the rear support bracket with the bottom end of the Y-47 pin and pushing the Y-47 pin upward; and removably engaging the rear support bracket with the yoke such that the rear support bracket supports the Y-47 pin. The rear support bracket may extend below bottom support lugs of the yoke.

The method may also include providing a fixed length, rigid, metallic tray configured to support a rail car air brake end hose, the tray having a first side wall, a second side wall, and a lower wall connecting the first and second side walls and engaged with the lower restraining wall; and engaging the tray with the bottom end of the rear support bracket.

The method may also include providing a rigid, adjustable, metallic front support bracket, the front support bracket having a tray opening formed by a first side restraining wall, a second side restraining wall, an upper restraining wall, and a lower restraining wall; engaging the front support bracket with an underside of a rail car; and engaging the tray with the front support bracket. The tray is movably engaged within the tray opening.

According to another aspect, a method for installing a rail car Y-47 pin in rail car is disclosed. The method includes providing a Y-47 pin having a top end and a bottom end, the Y-47 configured to be inserted into a rail car yoke; providing a rigid, metallic rear support bracket having a top end and a bottom end; inserting the Y-47 pin into the yoke; engaging the top end of the rear support bracket with the bottom end of the Y-47 pin and pushing the Y-47 pin upward; and removably engaging the rear support bracket with the yoke such that the rear support bracket supports the Y-47 pin. The rear support bracket may extend below the yoke.

The rear support bracket may form a portion of a rail car air brake end hose support assembly. The method may further include providing a tray configured to support a rail car air brake end hose; and engaging the tray with a bottom end of the rear support bracket. The method may also include providing a front support bracket, the front support bracket having an opening; engaging the front support bracket with an underside of a rail car; and engaging the tray with the front support bracket. The tray may be movably engaged within the opening.

The tray may have a first side wall, a second side wall, and a lower wall connecting the first and second side walls and engaged with the lower restraining wall. The tray opening may be formed by a first side restraining wall, a second side restraining wall, an upper restraining wall, and a lower restraining wall. The rear support bracket may be engaged with the yoke using a pin.

According to another aspect, a rail car air brake end hose support assembly is disclosed. The rail car air brake end hose support assembly includes a coupler; a substantially rigid portion of a trainline, the substantially rigid portion of the trainline movably engaged with the rail car; and a striker, the striker having a striker face. The lateral movement of the coupler is substantially independent of lateral movement of the rail car air brake end hose support assembly; the substantially rigid portion of the trainline operates only within a predefined operating envelope when the coupler is in the buff position; the predetermined operating envelope extends 30 inches or less laterally and is centered on a center of the rail car; the predetermined operating envelope extends 18 9/16 inches or less downward from about 17 13/16 below a top of the face of the striker; and the predetermined operating envelope extends 68 inches or less backward from the face of the striker.

The predetermined operating envelope may extend 5 9/16 inches or less downward from about 17 13/16 below the top of the face of the striker. The predetermined operating envelope may extend 26 3/16 inches or less laterally and is centered on the center of the rail car. The predetermined operating envelope may extend 18 13/16 inches or less laterally and is centered on the center of the rail car. The predetermined operating envelope may extend 14 11/16 inches or less laterally and is centered on the center of the rail car.

The rail car air brake end hose support assembly may include a rear support bracket, the rear support bracket having a top end and a bottom end, the rear support bracket engaged at a top end within a yoke. The rear support bracket supports a Y-47 pin. The rail car air brake end hose support assembly may also include a front support bracket engaged with an underside of the rail car, the front support bracket supporting the portion of the trainline. The front support bracket may include an opening, and the portion of the trainline may extend through the opening and is movable within the opening. The tray may support the portion of the trainline.

The lateral movement of the portion of the trainline may be constrained; the vertical movement of the portion trainline may be constrained; and the portion of the trainline may be configured to move longitudinally substantially similar to the longitudinal movement of a Y-47 pin of the rail car.

The rail car air brake end hose support assembly may have unintended trainline uncouplings.

BRIEF DESCRIPTION OF THE DRAWINGS

The present invention is illustrated by way of example and not limited in the accompanying figures in which like reference numerals indicate similar elements and in which:

FIG. 2A is a rear view of a rail car air brake end hose support assembly and portions of a rail car according to one or more aspects described herein.

FIG. 5A is a perspective view of a portion of the rail car air brake end hose support assembly of FIG. 1 according to one or more aspects described herein.

FIG. 5B is a front view of the portion of the rail car air brake end hose support assembly shown in FIG. 5A according to one or more aspects described herein.

FIG. 11 is a side view of a rail car air brake end hose support assembly within an operating envelope for a rail car air brake end hose support assembly and according to one or more aspects described herein.

Further, it is to be understood that the drawings may represent the scale of different components of one single embodiment; however, the disclosed embodiments are not limited to that particular scale.

DETAILED DESCRIPTION

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. Also, the reader is advised that the attached drawings are not necessarily drawn to scale.

In general, aspects of this invention relate to rail car air brake end hose support assemblies, and methods for installing rail car air brake end hose support assemblies or portions thereof. According to various aspects and embodiments, the rail car air brake end hose support assemblies described herein may be formed of one or more of a variety of materials, such as metals (including metal alloys), polymers, and composites, and may be formed in one of a variety of configurations, without departing from the scope of the invention. It is understood that the rail car air brake end hose support assemblies may contain components made of several different materials. Additionally, the components may be formed by various forming methods. For example, metal components, may be formed by forging, fabricating, welding, molding, casting, stamping, machining, and/or other known techniques. Additionally, polymer components, such as elastomers, can be manufactured by polymer processing techniques, such as various molding and casting techniques and/or other known techniques.

The various figures in this application illustrate examples of rail car air brake end hose support assemblies according to this invention. When the same reference number appears in more than one drawing, that reference number is used consistently in this specification and the drawings refer to the same or similar parts throughout.

Figure 1:
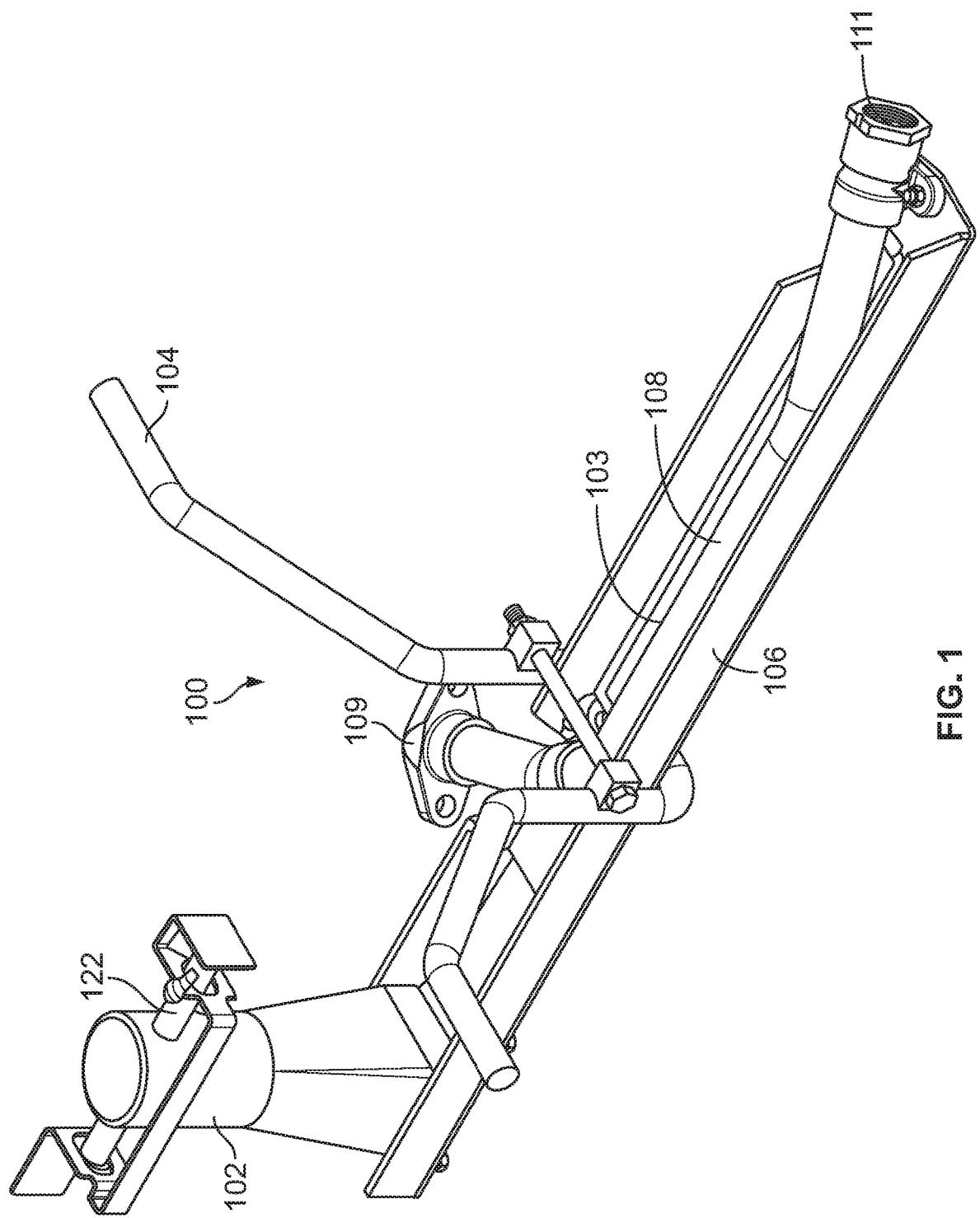
FIG. 1 is a perspective view of a rail car air brake end hose support assembly according to one or more aspects described herein.

FIG. 1 depicts an isometric view of a rail car air brake end hose support assembly 100. The assembly 100 may generally include a rear support bracket 102, a front support bracket 104, a tray 106, and a portion of a trainline 108. Although one configuration of a rail car air brake end hose support assembly is shown in FIG. 1, other embodiments, and as will be discussed in more detail below, having different sizes, shapes, and/or arrangements may exist.

Figure 2B:
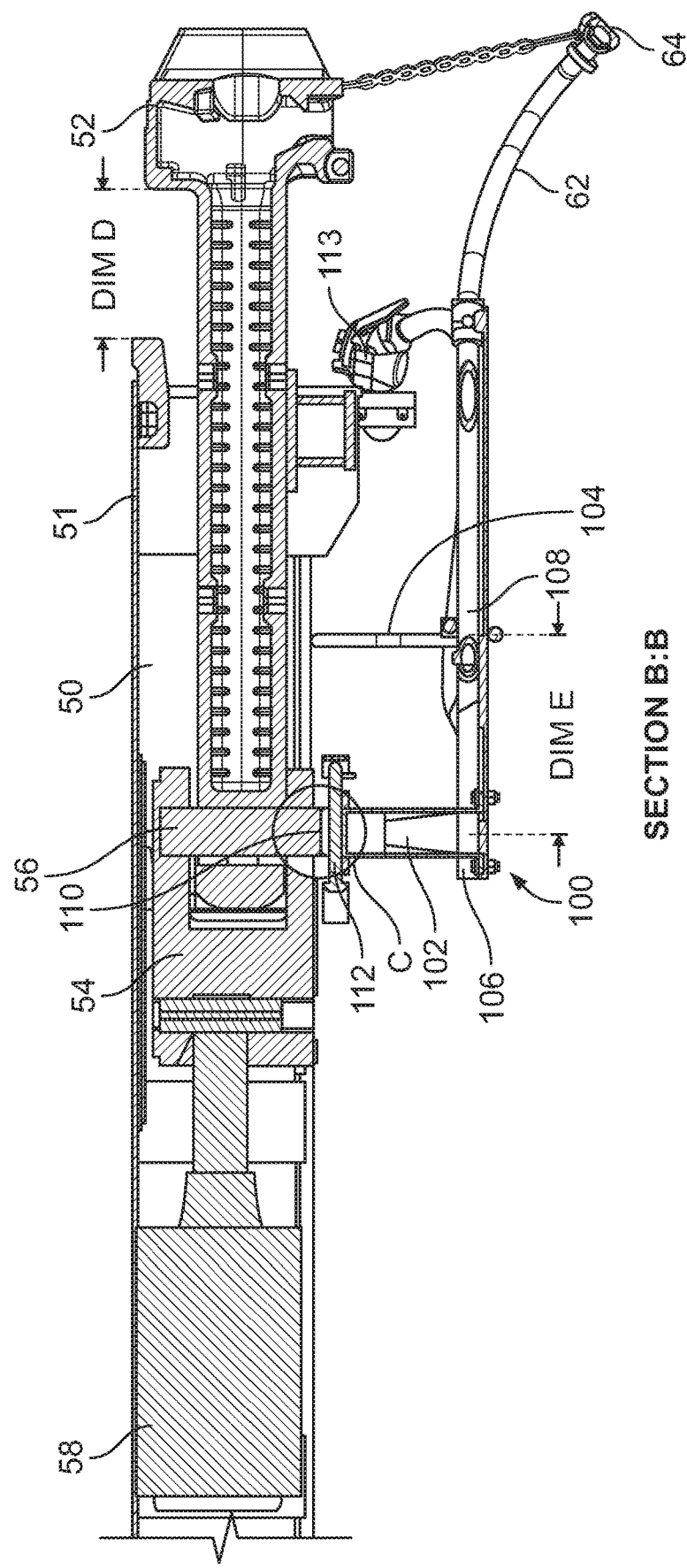
FIG. 2B is a side cross-sectional view of the rail car air brake end hose support assembly and portions of a rail car of FIG. 2A taken along line B-B according to one or more aspects described herein.

FIGS. 2A-2E depict views of the rail car air brake end hose support assembly 100 engaged with a rail car 50. Also shown in FIGS. 2A-2E are other typical rail car components which are engaged with or otherwise may interact with the rail car air brake end hose support assembly 100. These components include, the sill pocket 51 having a bell-mouth opening 53 (show in FIG. 6C), the coupler 52, the yoke 54, the Y-47 pin 56, a cushion unit 58, and the striker 60. As shown in FIG. 2B, the coupler 52 is pivotally engaged with the yoke 56 about the Y-47 pin 56. As shown in FIG. 2B, the portion of the trainline 108 is engaged with a rail car air brake end hose 62 which is engaged with a glad hand 64 hung from the coupler 52.

The Y-47 pin, as shown in FIG. 2B, is a pin that connects a yoke with the coupler body. The Y-47 pin in part, transfers the longitudinal draft load from the train, from the coupler body to the yoke. Some coupler bodies have a vertical elongated hole in the shank or located near the end of the shank. Some yokes have an associated vertical hole. For these types of couplers and yokes, the Y-47 pin, when installed vertically, "connects" the yoke with the coupler body. The Y-47 pin allows the hole in the shank of the coupler body to rotate about the Y-47 pin's vertical axis. The AAR Manual of Standards and Recommended Practices, Specification M-118 (2003 Revision), which is incorporated herein by reference, specifies the essential mechanical requirements for the Y-47 pin.

As described above, unintended rail car brake line uncouplings are a significant problem in the rail industry. These problems are compounded in rail cars having cushion units 58, as shown for example in FIG. 2B. Cushion units 58 allow the yoke and coupler to move longitudinally and the longitudinal movement may be 10 inches, 15 inches, 18 inches or in the range of about 9-20 inches. This additional movement may contribute to unintended trainline uncouplings. Many traditional brake line support assemblies allowed for increased range of motion of the brake line between the rail cars. Traditional thinking believed that this freedom of motion of the brake line would reduce unintended uncouplings by allowing the brake line to essentially float between the rail cars. An example of such a system is shown in U.S. Pat. No. 3,587,868 to Yates, assigned to Pullman Incorporated, which relates to a hose hanger for a trainline support that is engaged with a bracket mounted to the coupler head.

Counter to this traditional reasoning, the rail car air brake end hose support assemblies described herein constrain the motion of the of the rail car air brake end hose support assemblies instead of allowing the brake line to "float" between the rail cars. In other words, the rail car air brake end hose support assemblies described herein reduce degrees of freedom of movement of the end hose 62 compared to many traditional support assemblies. As will be described in more detail below, the rail car air brake end hose support assemblies described herein generally constrain the vertical and lateral movement of the portion of the trainline 108 while allowing the longitudinal movement of the portion of the trainline 108 to substantially mimic the longitudinal movement of the coupler 52 (or the Y-47 pin 56). Thus, the lateral movement of the rail car air brake end hose support assembly 100 is substantially independent of the lateral movement of the coupler 52. Such constraint of the brake line was conventionally thought to increase unintended brake line uncouplings, however, the rail car air brake end hose support assemblies discussed herein may instead advantageously reduce unintended brake line uncouplings.

Figure 4:
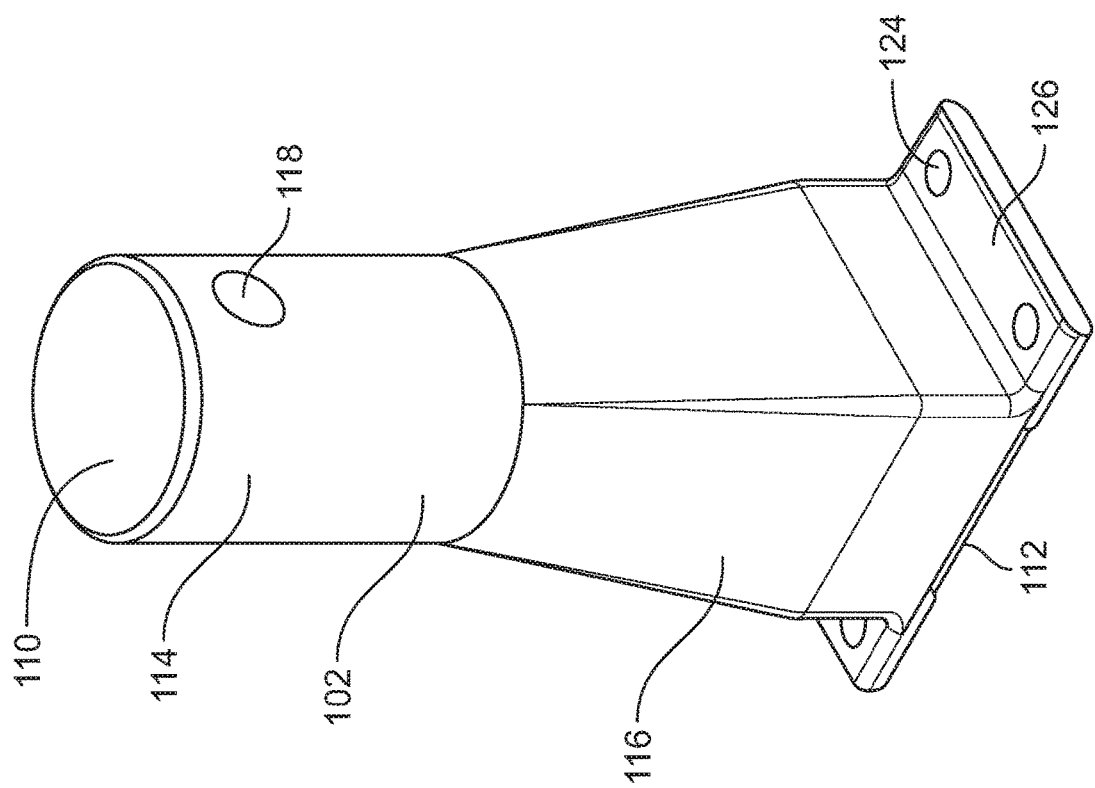
FIG. 4 is a perspective view of a portion of the rail car air brake end hose support assembly of FIG. 1 according to one or more aspects described herein.

Referring now in more detail to each of the rail car air brake end hose support assembly components, the rear support bracket of FIG. 1 is shown in more detail in FIG. 4.

The rear support bracket 102 may be substantially rigid and may be formed of a metallic material or other suitable material. The rear support bracket 102 may have a top end 110 and a bottom end 112. As shown in FIG. 4 in some embodiments the rear support bracket 102 may have a top portion 114 having a different cross-sectional shape than the bottom portion 116. For example, and as shown in FIG. 4, the top portion 114 may have a circular cross-sectional shape and the bottom portion 116 may have a rectangular or square cross-sectional shape.

Figure 2C:
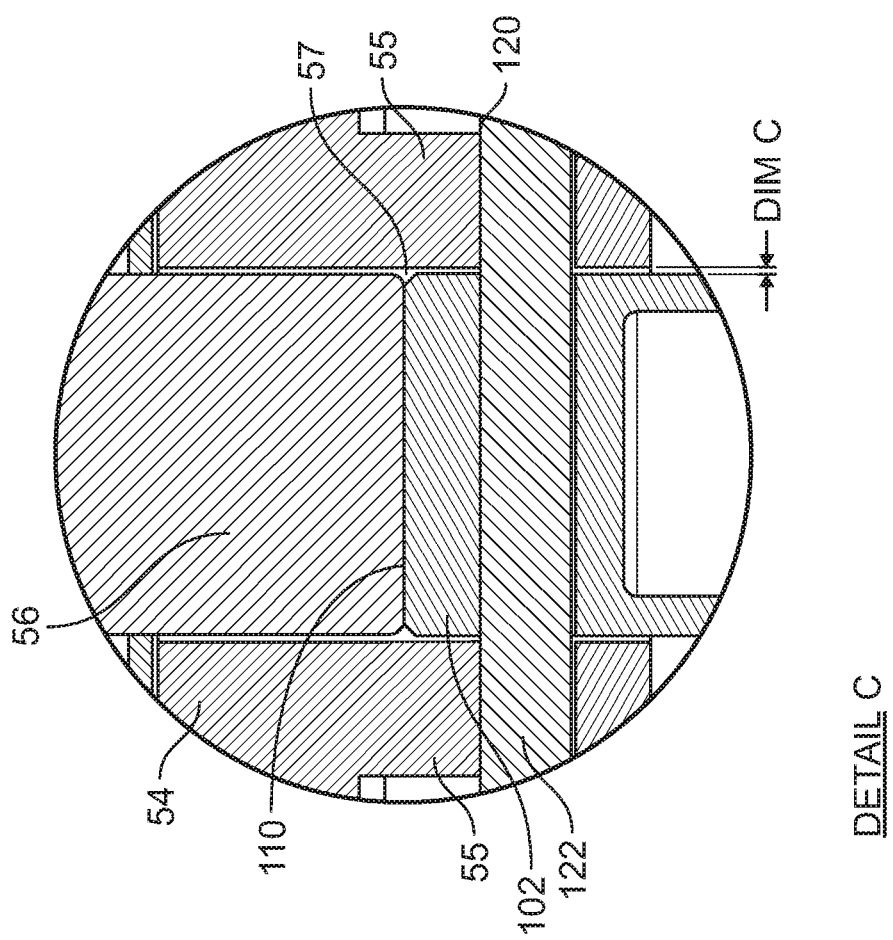
FIG. 2C is a detailed view of a portion of the rail car air brake end hose support assembly and portions of a rail car of Detail C shown in FIG. 2B according to one or more aspects described herein.
Figure 2D:
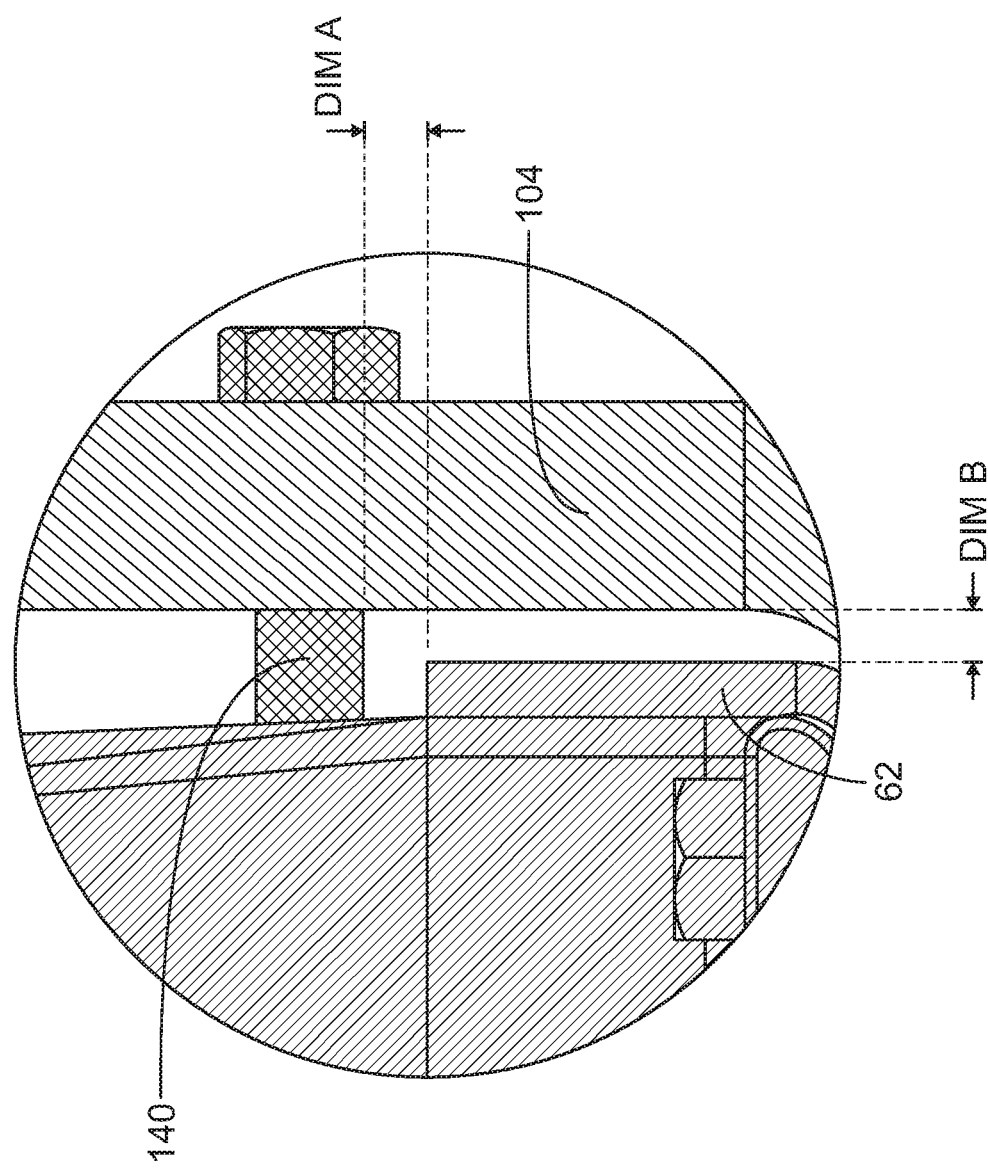
FIG. 2D is a detailed view of a portion of the rail car air brake end hose support assembly and portions of a rail car of Detail D shown in FIG. 2A according to one or more aspects described herein.
Figure 2E:
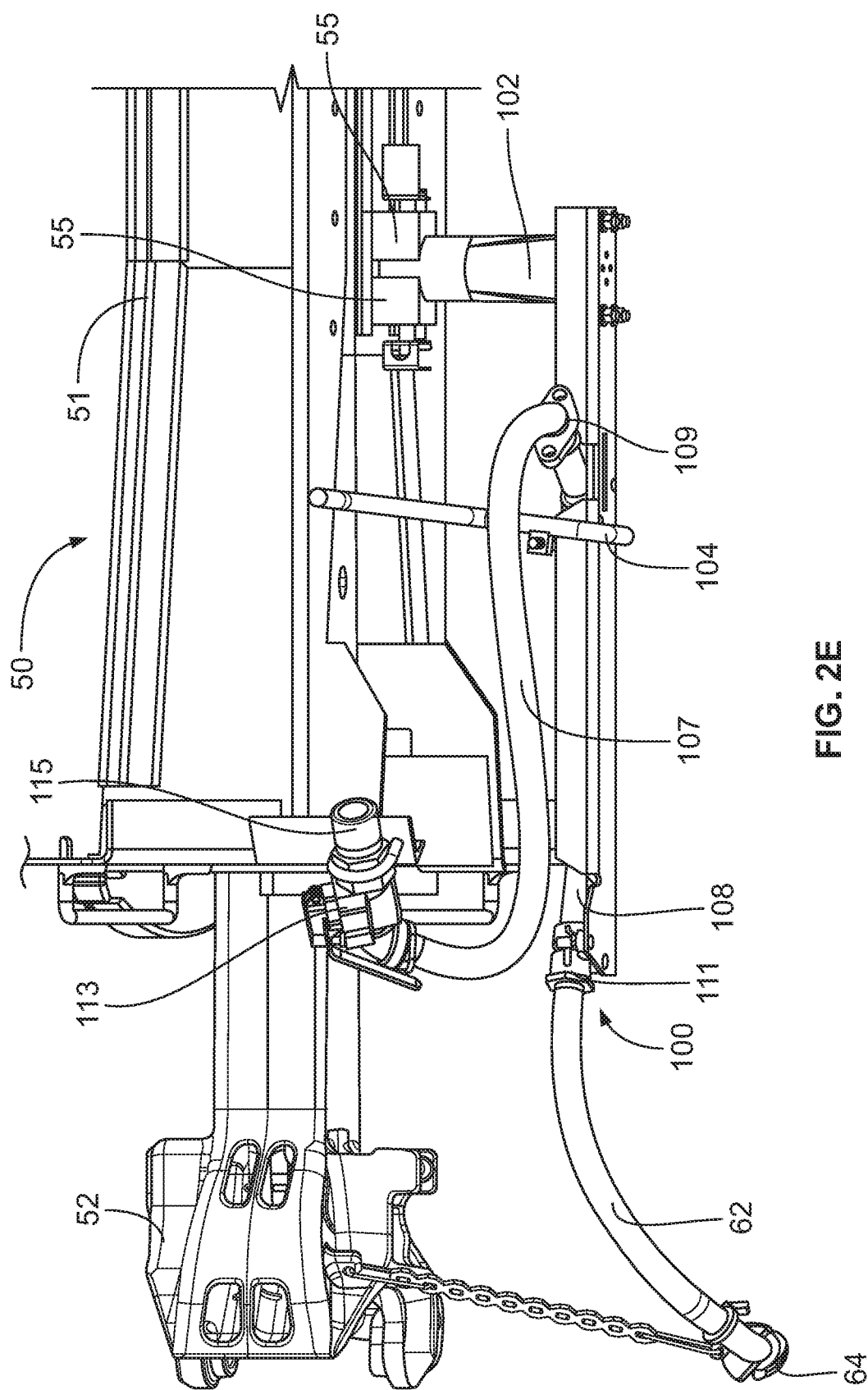
FIG. 2E is a perspective view of a rail car air brake end hose support assembly and portions of a rail car according to one or more aspects described herein.
Figure 3A:
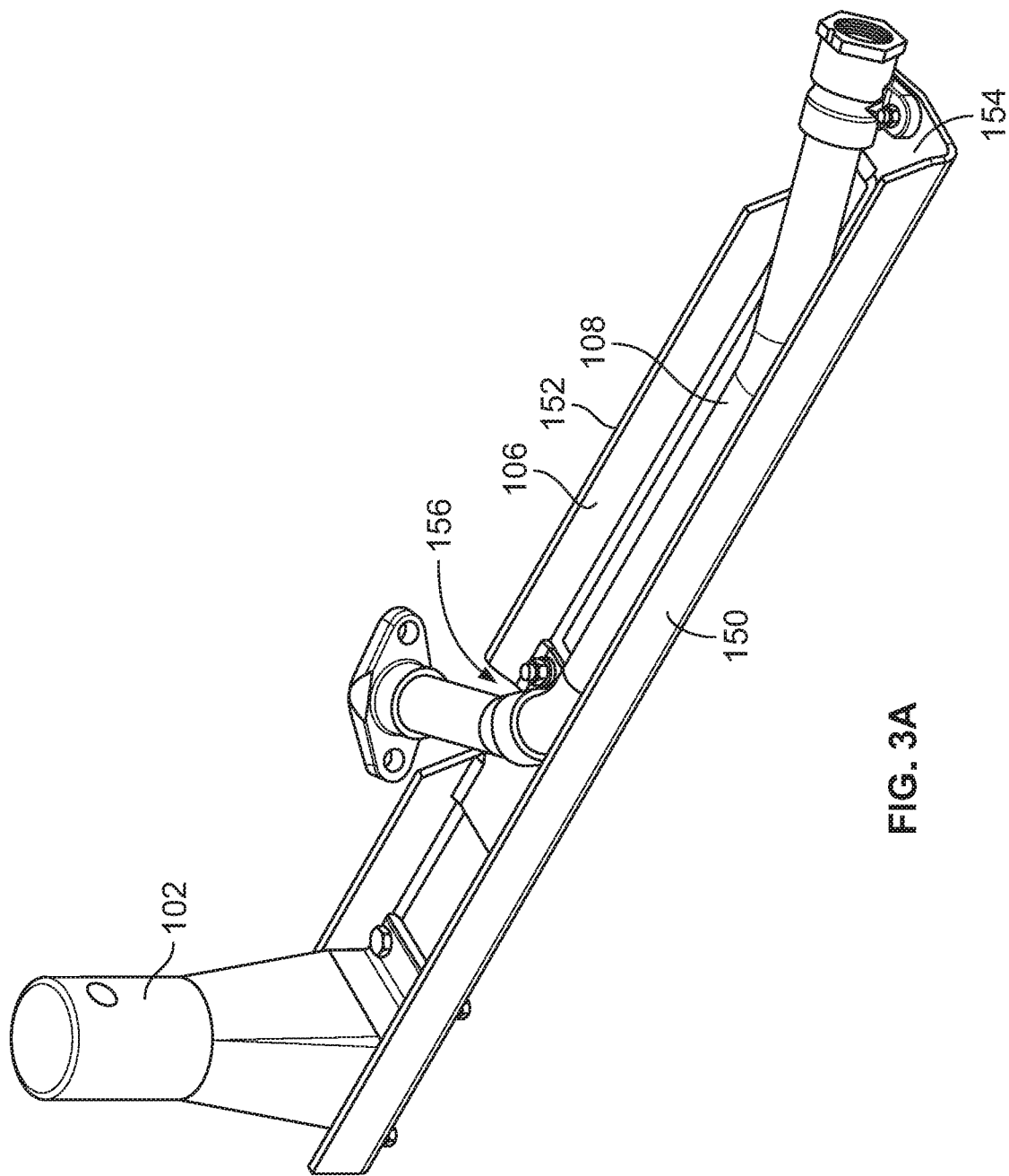
FIG. 3A is a perspective view of a portion of the rail car air brake end hose support assembly of FIG. 1 according to one or more aspects described herein.
Figure 3B:
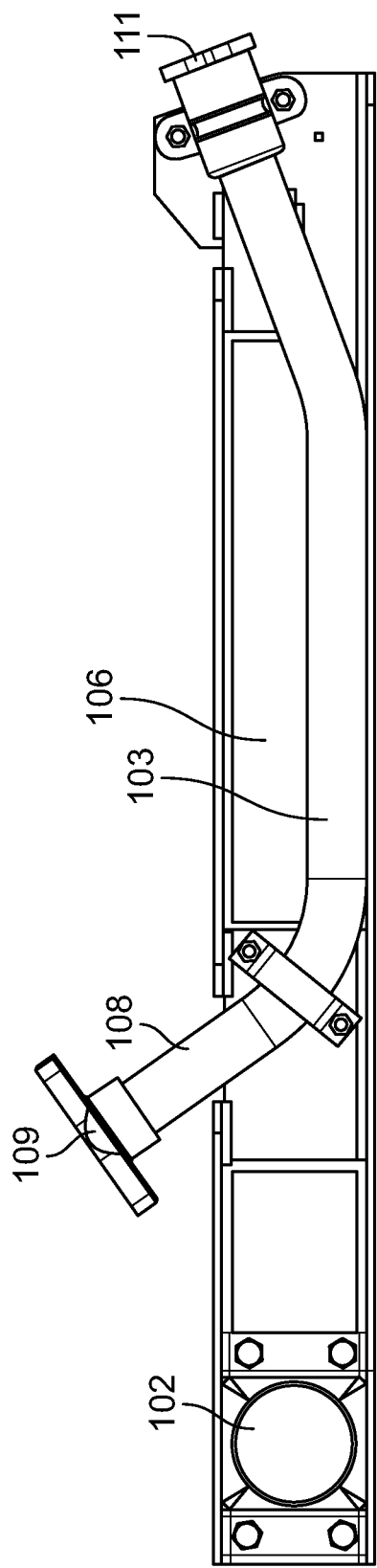
FIG. 3B is a top view of the portion of the rail car air brake end hose support assembly shown in FIG. 3A according to one or more aspects described herein.
Figure 3C:
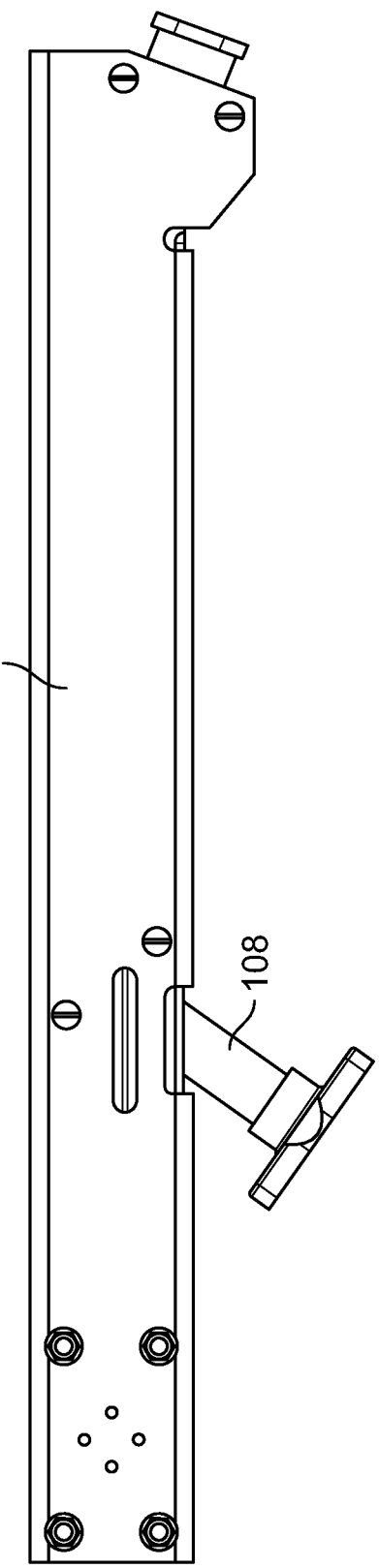
FIG. 3C is a bottom view of the portion of the rail car air brake end hose support assembly shown in FIG. 3A according to one or more aspects described herein.

As shown in FIG. 2B, the top end 110 or top portion 114 of the rear support bracket 102 may be directly engaged within the yoke 54. The engagement between the yoke 54 and the rear support bracket 102 may be a substantially rigid engagement. The yoke 54 and the rear support bracket 102 may be removably engaged. As best shown in FIGS. 2B and 2C, the rear support 102 extends upward into the Y-47 pin hole 57 and may be surrounded by the yoke lugs 55. As shown in FIGS. 1, 2C, and 4, the rear support bracket 102 may have an aperture 118 in the top portion 114. The aperture 118 may be configured to line up with a corresponding aperture 120 in the yoke 54, and a pin 122 may be configured to fit through the apertures 118 and 120 to removably engage the top portion 114 or top end 110 of the rear support bracket 102 within the yoke. As will be discussed in more detail below, the top end 110 of the rear support bracket 102 is configured to support the Y-47 pin 56. In some embodiments, the rear support 102 is substantially parallel to the Y-47 pin 56. Additionally, in some embodiments the weight of the Y-47 pin provides a restoring force to the top end of the rear support bracket 102 which may generally force the rear support 102 to stay substantially parallel to the Y-47 pin 56 during operation. And in still other embodiments the Y-47 pin 56 may be formed integrally with the rear support 102.

As shown in FIGS. 1 and 4, the rear support bracket may be engaged with the tray 106. The engagement between the tray and the rear support bracket 102 may be a rigid engagement and the tray and the rear support bracket may be removably engaged. As shown in FIG. 4, the rear support bracket 102 may include one or more mounting apertures 124 which may be used along with one or more mechanical fasteners to engage the tray with the rear support bracket 102. As shown in FIG. 4, the bottom portion 116 or bottom end 112 may include one or more mounting brackets 126 extending outward from the rear support bracket 102. In some embodiments the mounting apertures 124 may pass through these mounting brackets 126. In other embodiments, the mounting bracket 126 may be omitted. For example, in some embodiments the mounting apertures 124 may extend into the bottom end of the rear support bracket 102. In still other embodiments the rear support bracket 102 and the tray may be formed of a single uniform piece.

Referring now primarily to FIGS. 1, 5A, and 5B the rail car air brake end hose support assembly 100 may include a front support bracket 104. Generally, the front support bracket is configured to restrain the vertical and/or lateral movement of the portion of a trainline 108 while allowing longitudinal movement of portion of the trainline 108 to substantially mimic the longitudinal motion of the coupler 52. The front support bracket 104 may be substantially rigid and may be formed of a metallic material or other suitable material. As best shown in FIG. 2B, the front support bracket 104 may be mounted to an underside of a rail car. The front support bracket 104 may be mounted to an underside of a rail car using any suitable means, including for example, welding. The front support bracket 104 may include first and second downward extending arms 130, 132. The front support bracket may also include a tray opening 134 formed by a first side restraining wall 136, a second side restraining wall 138, an upper restraining wall 140, and a lower restraining wall 142. One or more of the restraining walls 136, 138, 140, 142 forming the opening may be removably engaged with the front bracket. As shown in FIGS. 5A and 5B, the upper restraining wall 140 is removably engaged with the front bracket 104 using mechanical fasteners. As will be described in greater detail below, allowing one of the restraining walls 136, 138, 140, 142 to be removably engaged with the front bracket 104 may allow for easier installation and removal of the assembly tray 106. As shown in FIG. 2B, the front support bracket 104 is mounted a distance (DIM E) forward of the rear support bracket 102. Although this distance (DIM E) can be any suitable distance, in some embodiments DIM E can be about 14⅝ inches or in the range of about 10 to 18 inches (plus any movement of the coupler).

Figure 5C:
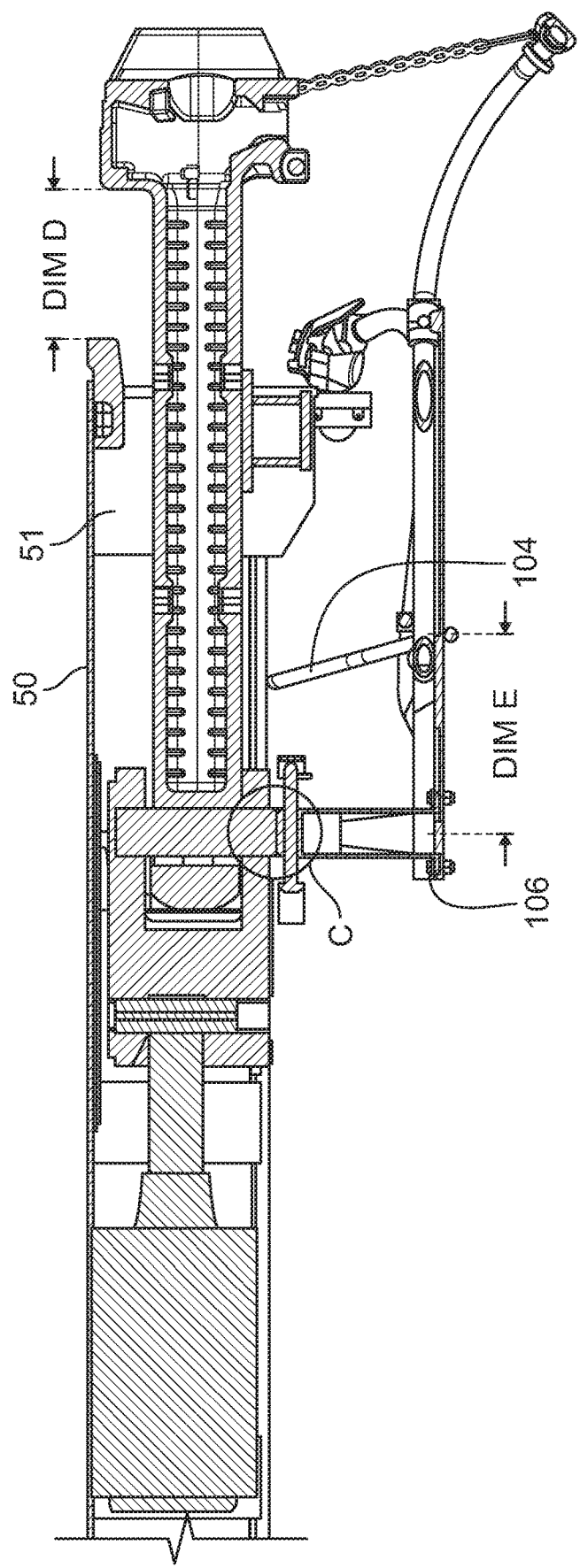
FIG. 5C is a side cross-sectional view of the rail car air brake end hose support assembly and portions of a rail car according to one or more aspects described herein.

In some embodiments the front support bracket 104 may be adjustable such that the distance the front support bracket 104 extends downward from the rail car may be adjusted. As shown in FIG. 5C the front support bracket 104 may be adjustable by changing the angle at which the front support bracket 104 is mounted relative to the rail car 50. In embodiments it may be advantageous to mount the front support bracket at an angle relative to the rail car such that the tray 106 is substantially parallel to the ground.

Referring now primarily to FIGS. 1 and 3A-3C, the rail car air brake end hose support assembly 100 may include a tray 106. The tray 106 may be substantially rigid and may be formed of a metallic material or other suitable material. The tray 106 may also be of a fixed length. The tray 106 may be configured to support a rail car air brake end hose or a portion of a trainline 108 that may be engaged with the tray 106. The tray may include a first side wall 150, a second side wall 152, and a lower wall 154 connecting the first and second side walls 150, 152. Sidewalls 150, 152 may include one or more openings 156 through which the portion of the rail car 108 may pass. As discussed above, the tray 106 may be removably engaged with the bottom end 112 of the rear support. As shown in FIG. 1, the tray 106 may be configured to extend through the tray opening 134 and may be movably engaged within the tray opening 134. In some embodiments, the tray 106 may engage the lower restraining wall 142 of the front support 104. In other embodiments the tray 106 may be formed without first and second side walls 150, 152. In still other embodiments, the rail car air brake end hose support assembly 100 may be formed without a tray 106.

As shown in FIG. 1, the portion of the trainline 108 may have a first connection point or coupling point 109 configured to engage another portion of the trainline and a second connection point 111 configured to engage the rail car air brake end hose 62. As best shown in FIGS. 2A-2E, the portion of the trainline 108 may be connected to an intermediate flexible hose 107 at the first connection point 109. The flexible hose 107 may be connected at the end opposite to the first connection point 109 with an angle cock 113, which may be connected to another portion of the trainline 115. The angle cock 113 may be mounted substantially longitudinally aligned with the end sill.

Figure 10A:
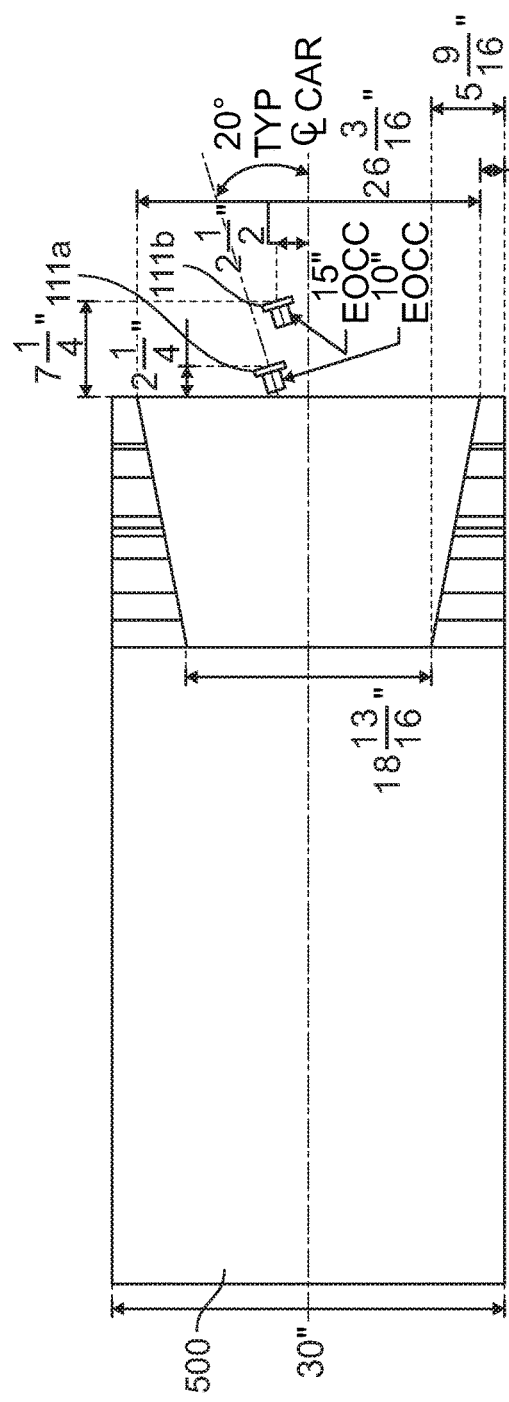
FIG. 10A is a top view of an operating envelope for a rail car air brake end hose support assembly according to one or more aspects described herein.
Figure 10B:
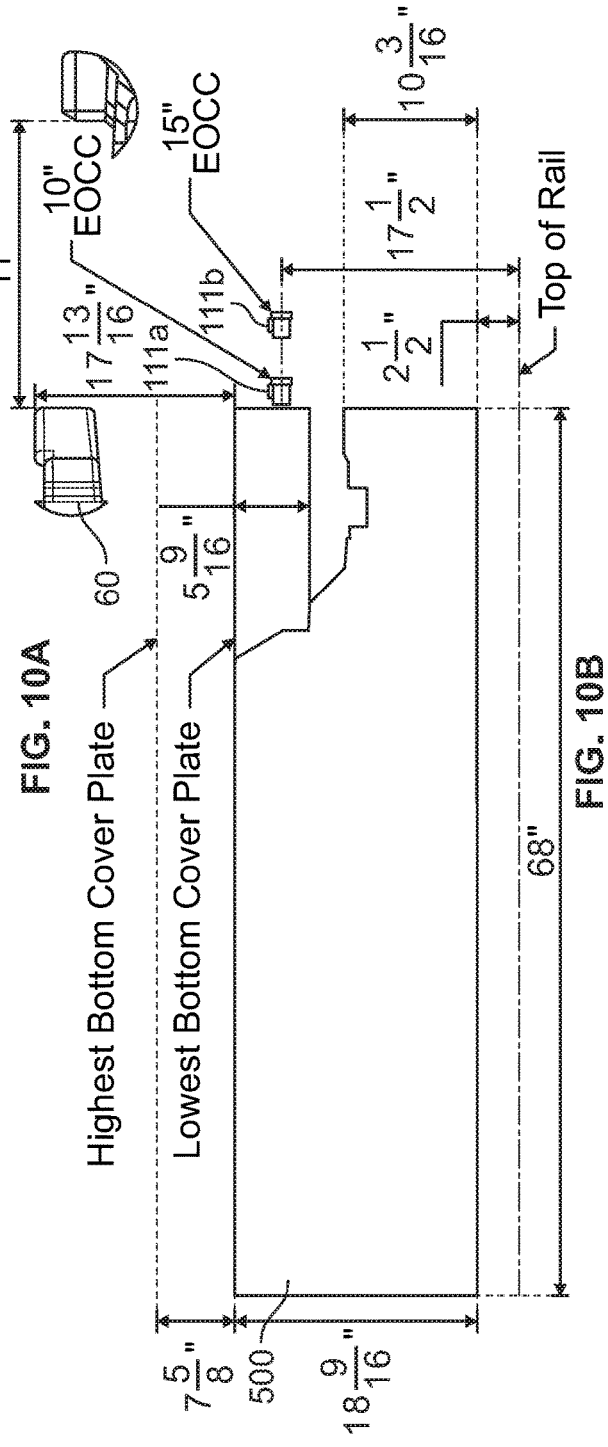
FIG. 10B is a side view of an operating envelope for a rail car air brake end hose support assembly according to one or more aspects described herein.

The first connection point 109 and second connection point 111 may be rigidly connected to the rear support 102 through other components of the assembly 100. As shown in FIGS. 1 and 2A, a center portion 103 of the portion of the trainline 108 may be substantially parallel and/or in line with the longitudinal center line of the rail car. The portion of the rail car 108 may include angled portions, however, such that connection points 109 and 111 or not in line with the longitudinal center of the rail car 50. Advantageously this may allow the two rail car air brake end hoses 62 connected at a glad hand 64 (see FIGS. 6A-6E) to generally form an S-shape between two adjacent cars. In some embodiments the connection point 111 may be located about 2.5 inches off of the longitudinal center line of the rail car. In other embodiments, the connection point 111 may be located between about 1 inch and 6 inches off of the longitudinal center line of the rail car. Additionally, as best shown in FIGS. 10A and 10B, the connection point 111 may extend longitudinally beyond the striker 60 when the coupler is in a draft position. For example, as shown in FIGS. 10A and 10B, the second connection point 111a may extend 2.25 inches beyond the striker 60, or in the range of about 1 inch to 5 inches, in the draft position. Additionally, for example, as shown in FIGS. 10A and 10B, the second connection point 111b may extend 7.25 inches beyond the striker 60, or in the range of about 5 inches to 10 inches, in the draft position.

The tray 106 may be configured to move laterally, longitudinally, and vertically within the tray opening 134. In some embodiments, however, the lateral, longitudinal, and/or vertical movement of the tray 106 may be restricted or constrained.

As described above, the rail car air brake end hose support assemblies described herein generally constrain the vertical and lateral movement of the portion of the trainline 108 while allowing the longitudinal movement of the portion of the trainline 108 to substantially mimic the longitudinal movement of the coupler 52 (or the Y-47 pin 56 or the yoke 54). Thus, in some embodiments, the rail car air brake end hose support assembly 100 may be restrained laterally and vertically, such that the longitudinal movement of the rail car air brake end hose support assembly 100 is substantially similar to the longitudinal movement of the coupler 52, but the lateral and vertical movement of the rail car air brake end hose support assembly 100 is independent of the lateral and vertical movement of the coupler 52. Further, the longitudinal movement of the portion of the trainline 108 and/or the tray 106 may be substantially similar to the longitudinal movement of the Y-47 pin 56 of the rail car.

In some embodiments, the first side restraining wall 136 and the second side 138 restraining wall may be configured to constrain lateral movement of the portion of the trainline 108 (or the tray 106) within the tray opening 134. The lateral movement of the portion of the trainline 108 (or the tray 106) may be restricted to movement equal to DIM B shown in FIG. 2D on either side. In some embodiments, DIM B may be equal to about 0.25 inches. Thus the total lateral movement of the portion of the trainline 108 (or the tray 106) at the front support 104 may be less than or equal to 0.5 inch of lateral movement. In other embodiments, the lateral movement of the portion of the trainline 108 (or the tray 106) may be less than or equal to 1 inch of lateral movement, or less than or equal to 1.5 inches of lateral movement, or less than or equal to 3 inches of lateral movement.

Similarly, in some embodiments, the top restraining wall 140 and the bottom restraining wall 142 wall may be configured to constrain vertical movement of the portion of the trainline 108 (or the tray 106) within the tray opening 134. The vertical movement of the portion of the trainline 108 (or the tray 106) may be restricted to movement equal to DIM A shown in FIG. 2D. In some embodiments, DIM A may be equal to about 0.3125 inch. Thus the total vertical movement of the portion of the trainline 108 (or the tray 106) at the front support 104 may be less than or equal to 0.3125 inch of vertical movement. In other embodiments, the vertical movement of the portion of the portion of the trainline 108 (or the tray 106) may be less than or equal to 0.5 inch of vertical movement, or less than or equal to 0.75 inch of vertical movement, or less than or equal to 1 inch of vertical movement.

As should be understood from the Figures, because the portion of the trainline 108 (or the tray 106) is rigidly connected to the rear support 102, the trainline 108 (or the tray 106) may generally rotate about the rear support 102. Thus, DIM B and DIM A discussed above may differ based on the distance, DIM E, that the front support 104 is mounted from the rear support. The above values for DIM B and DIM A have been calculated with a DIM E of about 14⅝ inches. Thus, as DIM E becomes larger, the allowable lateral and/or vertical movement of the trainline 108 (or the tray 106) at the front support 104 also becomes larger and similarly as DIM E shrinks the allowable lateral and/or vertical movement of the portion of the trainline 108 (or the tray 106) at the front support also shrinks.

As discussed above, importantly the portion of the trainline 108 is rigidly connected to the rear support 102 and that the portion of the trainline 108 is itself also rigid. These rigid connections may be accomplished in many ways. For example, in some embodiments, a portion of the trainline 108 may be flexible, but may be rigidly engaged to the tray 106. Additionally, in other embodiments, the portion of the trainline 108 may be rigidly connected directly to the rear support 102 (without use of the tray 106). Further, important to the rail car air brake end hose support assemblies discussed herein, the lateral and/or vertical movement of the portion of the trainline 108 (or the tray 106) is constrained. This allows the lateral and/or vertical motion of the portion of the trainline 108 (or the tray 106) to be independent of the lateral and/or vertical motion of the coupler 52, but have longitudinal motion similar to the longitudinal motion of the coupler 52.

Figure 6A:
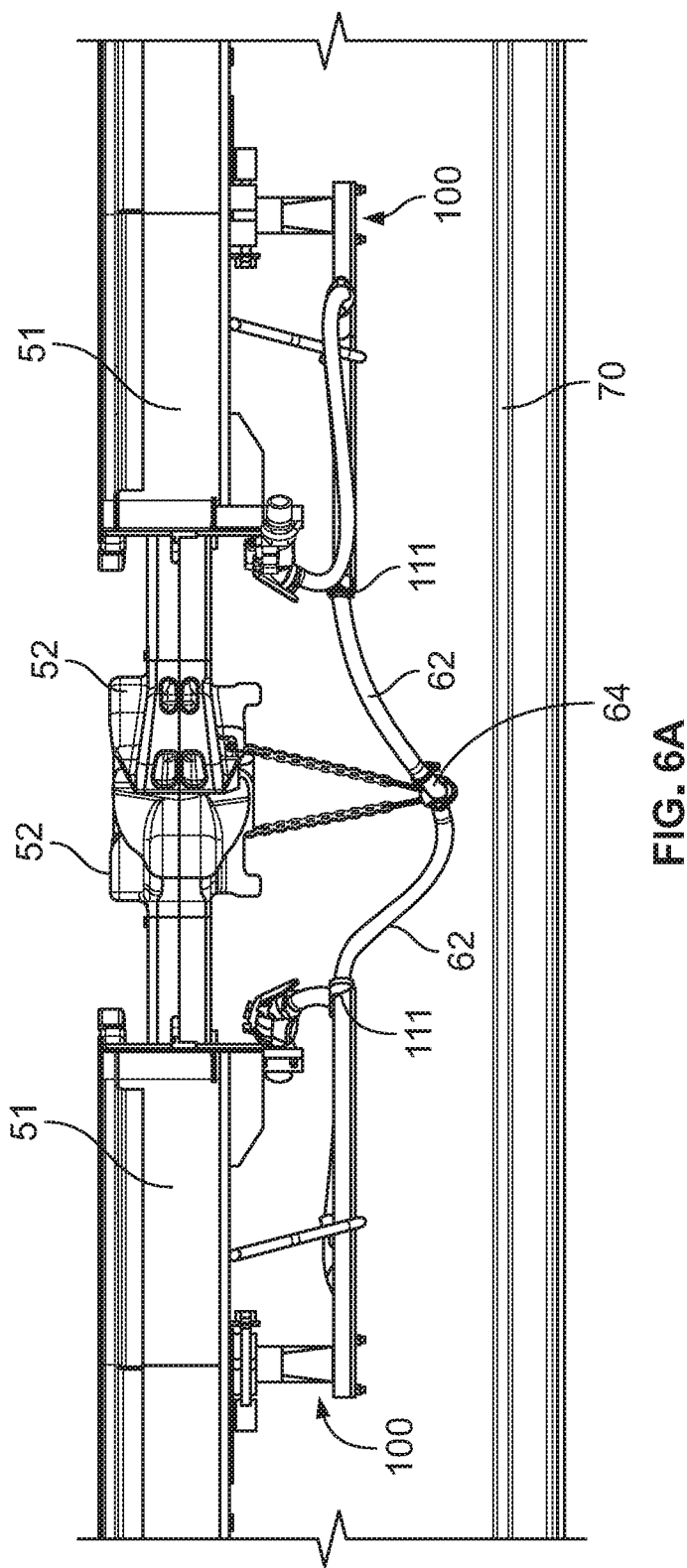
FIG. 6A is a side view of rail car portions each including a rail car air brake end hose support assemblies according to one or more aspects described herein.

FIG. 6A shows a side view of two rail cars 50 (having certain portions of the rail car removed), over a rail 70, engaged at their respective couplers 52 and also shows two rail car air brake end hose support assemblies 100 supporting two rail car air brake end hoses 62 connected at glad hands 64.

Figure 6B:
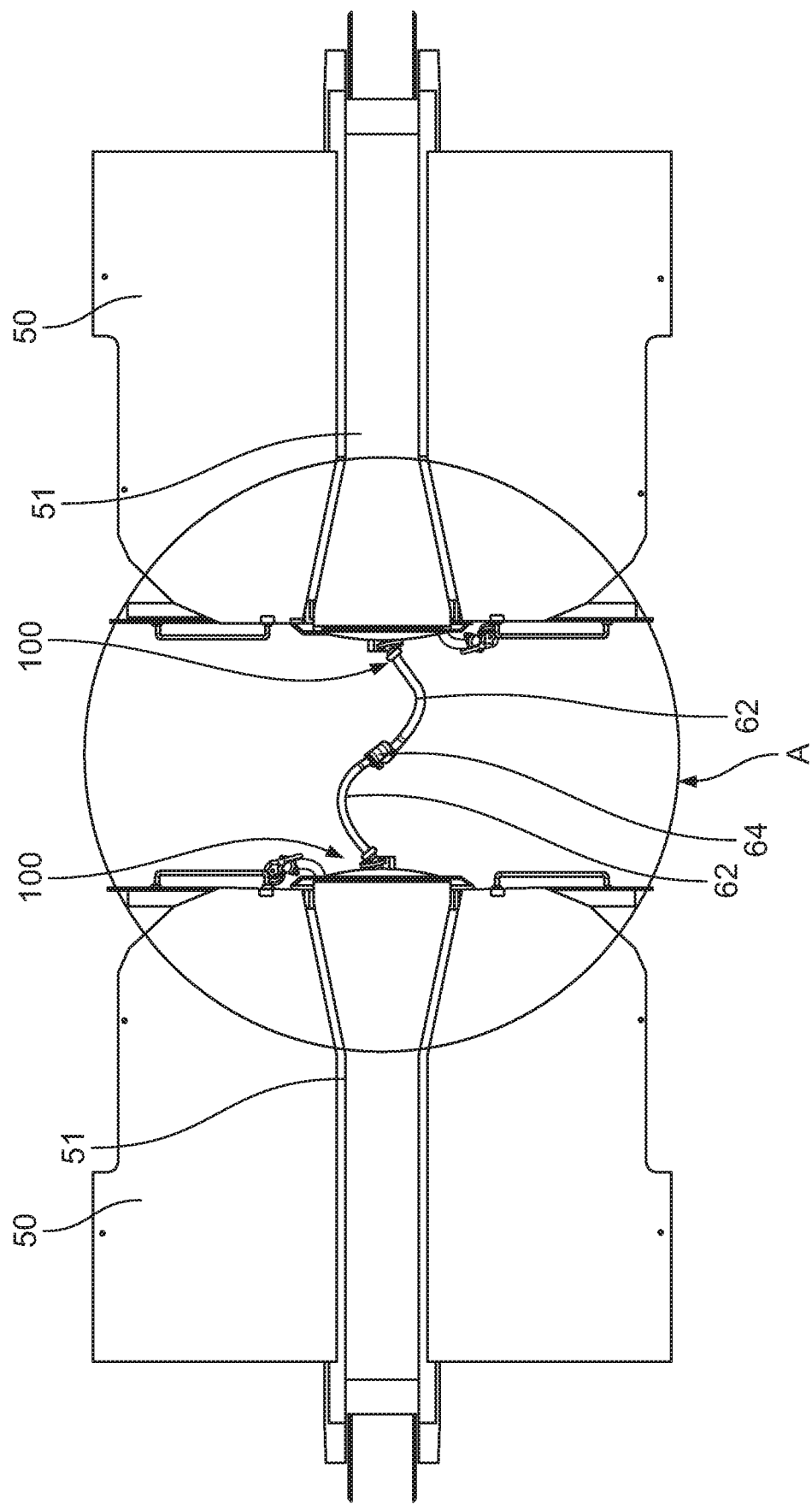
FIG. 6B is a top view of rail car portions each including a rail car air brake end hose support assemblies according to one or more aspects described herein.
Figure 6C:
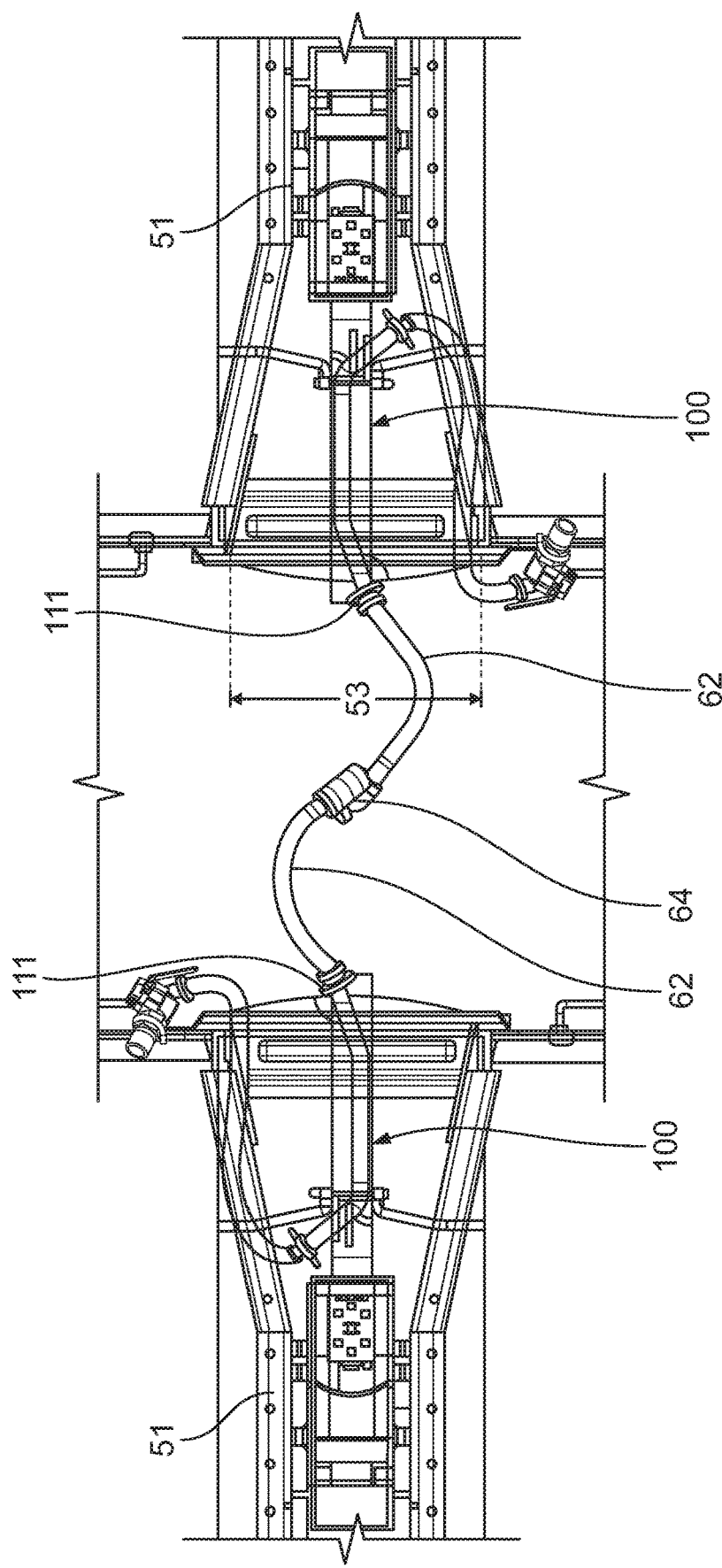
FIG. 6C is a detailed view FIG. 6B of rail car portions each including a rail car air brake end hose support assemblies according to one or more aspects described herein.

FIG. 6B shows a top view of two rail cars 50 (having certain portions of the rail car removed), (with the couplers 52 removed) and also shows two rail car air brake end hose support assemblies 100 supporting two rail car air brake end hoses 62 connected at glad hands 64. FIG. 6C shows a detailed view of a portion of FIG. 6B (having certain portions of the rail car removed). As discussed above, because the second connection points 111 of each of the two rail car air brake end hose support assemblies 100 are offset from the longitudinal centerline of the cars 50, the two connected rail car air brake end hoses 62 generally form an S-shape between two adjacent cars. The S-shape formed by the two connected rail car air brake end hoses 62 may reduce or eliminate kinks in the air brake end hoses 62 during operation. The reduction in kinks in the air brake end hoses 62 may be because the air brake end hoses 62 are not exposed to forces (or exposed to reduced forces) from an adjacent car's end arrangement forcing them over to one side. As discussed above, many previous end hose support arrangements allowed for significant movement of the end hose support arrangement including, a wide swing in the lateral direction. Such arrangements can produce kinking in the air brake end hose especially when the arrangement is at its greatest lateral swing position. End hose support assemblies 100 discussed herein may reduce this end hose kinking and in turn may reduce unintended uncouplings of the end hoses 62.

Figure 6D:
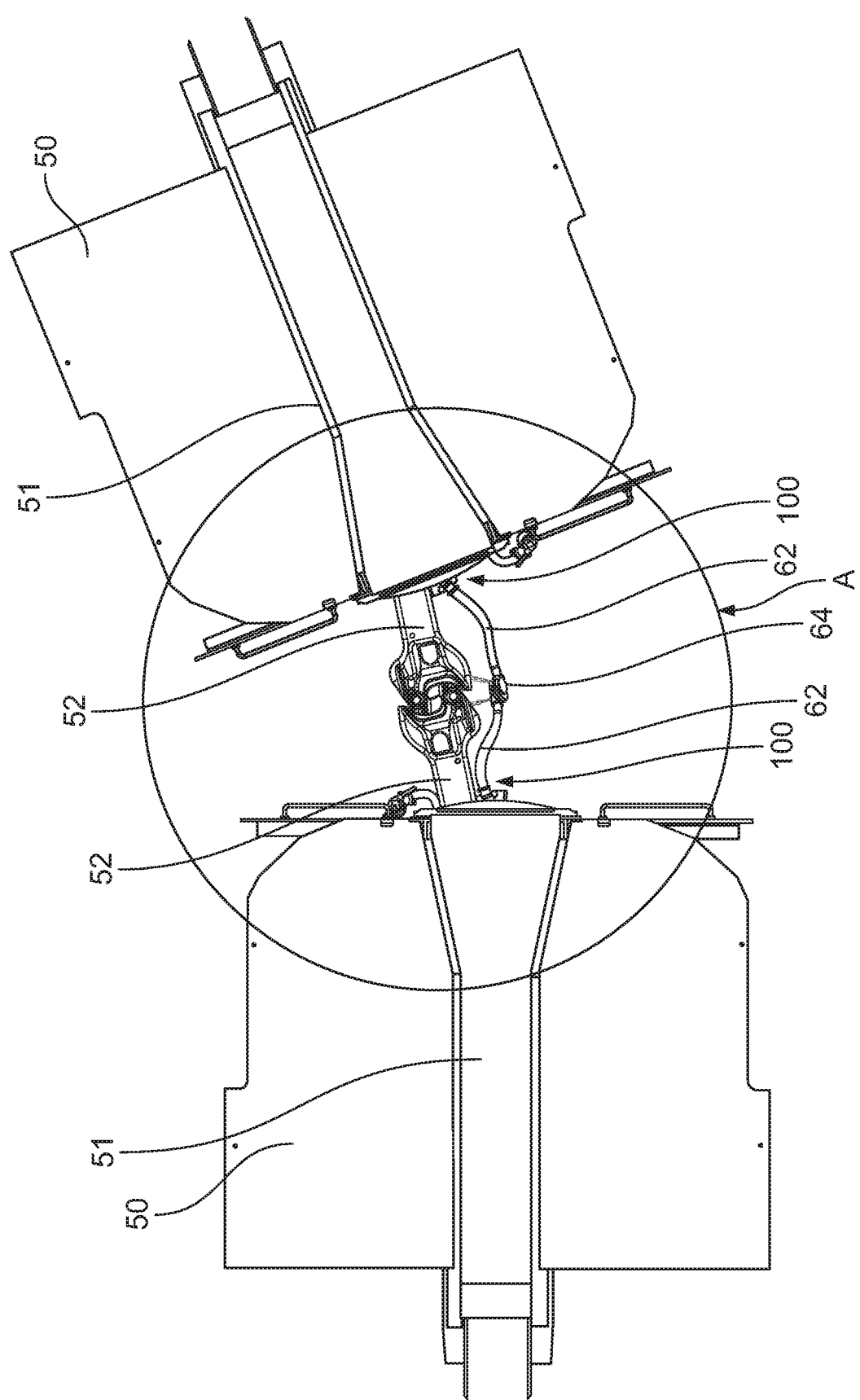
FIG. 6D is a top view of rail car portions each including a rail car air brake end hose support assemblies according to one or more aspects described herein.
Figure 6E:
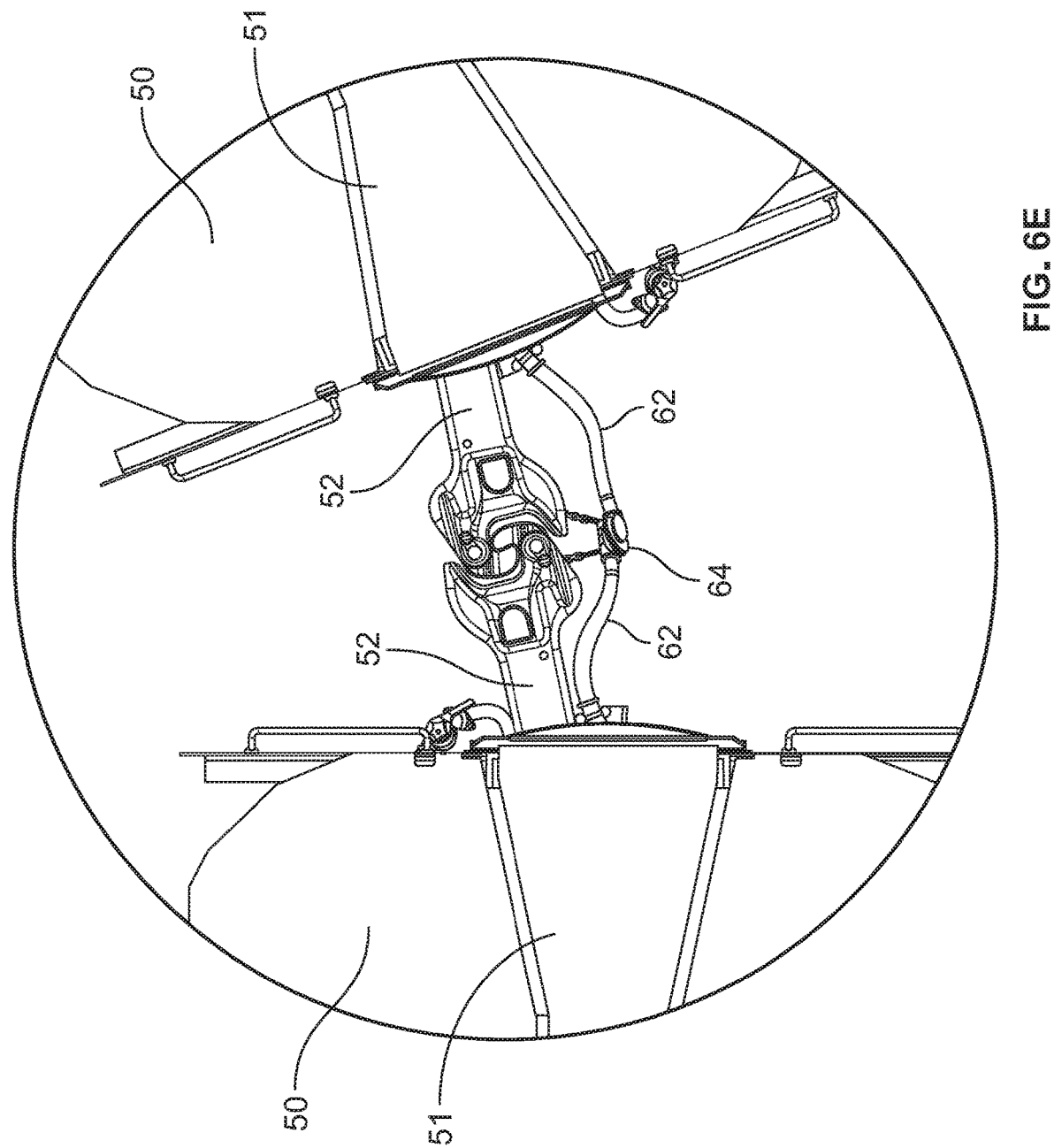
FIG. 6E is a detailed view FIG. 6D of rail car portions each including a rail car air brake end hose support assemblies according to one or more aspects described herein.

FIG. 6D shows a top view of two rail cars 50 (having certain portions of the rail car removed), similar to FIGS. 6B and 6C above, but in FIG. 6D, the rail cars 50 are shown going around a curve. FIG. 6E shows a detailed view of a portion of FIG. 6D. As shown in FIG. 6D, as the rail car 50 goes around a curve, the couplers 52 may swing within the bell-mouth openings 53 (show in FIG. 6C) of the sill pockets 51. As discussed above, because the second connection points 111 of each of the two rail car air brake end hose support assemblies 100 are offset from the longitudinal centerline of the cars 50, the two connected rail car air brake end hoses 62 generally form an S-shape between two adjacent cars. The S-shape may be become straighter as the rail cars negotiate a curve as shown in FIGS. 6E and 6D.

Figure 7:
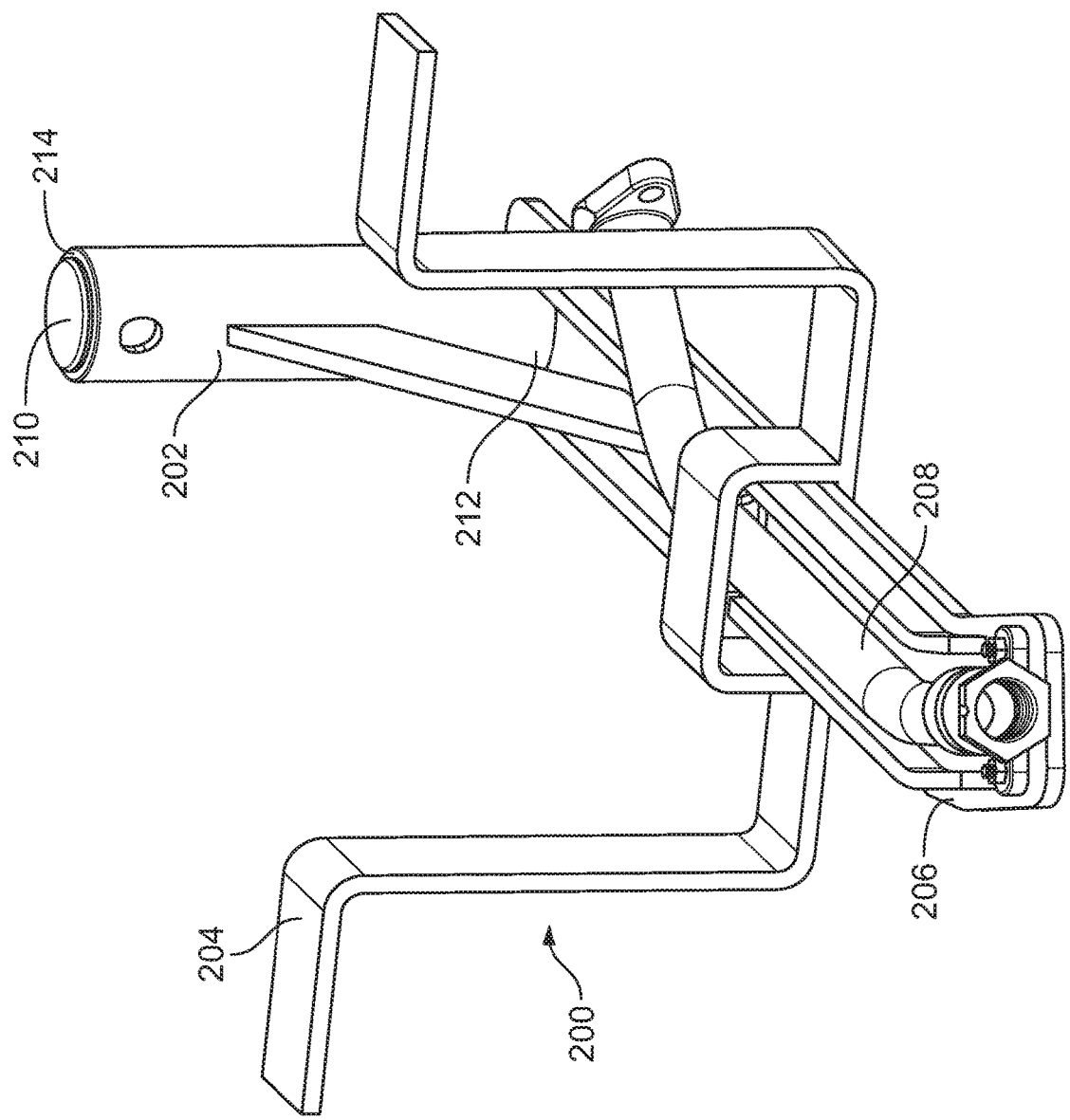
FIG. 7 is a perspective view of a rail car air brake end hose support assembly according to one or more aspects described herein.
Figure 8A:
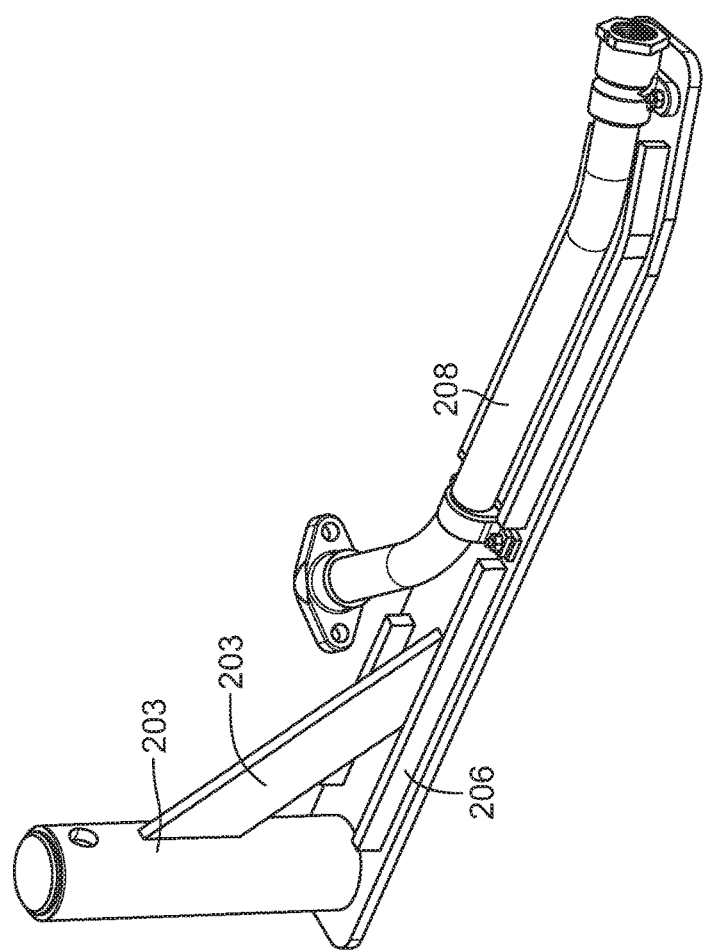
FIG. 8A is a perspective view of a portion of the rail car air brake end hose support assembly of FIG. 7 according to one or more aspects described herein.
Figure 8B:
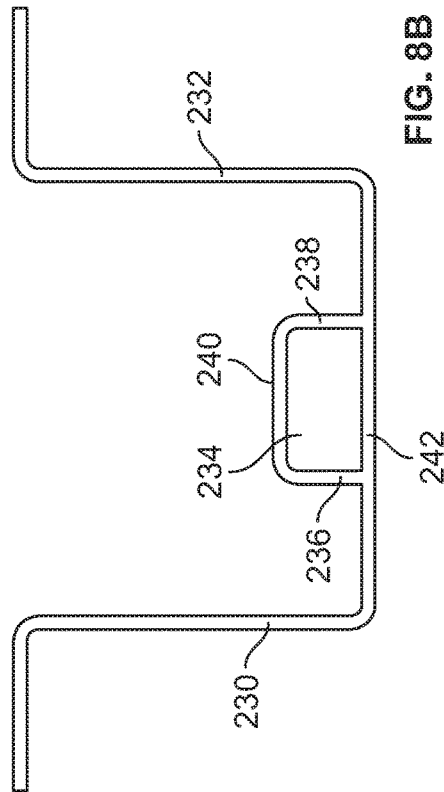
FIG. 8B is a front view of a portion of the rail car air brake end hose support assembly of FIG. 7 according to one or more aspects described herein.

FIGS. 7, 8A, and 8B depict another embodiment of a rail car air brake end hose support assembly 200 according to aspects of this disclosure, wherein like reference numerals refer to the same or similar elements in the rail car air brake end hose support assembly 100 but include 200 series reference numerals.

FIG. 7 depicts an isometric view of a rail car air brake end hose support assembly 200. Like assembly 100, assembly 200 may include a rear support bracket 202, a front support bracket 204, and a tray 206 including a portion of a trainline 208. FIG. 8A depicts an isometric view of the rail car air brake end hose support assembly 200 without the front support bracket 204 and FIG. 8B depicts a front view of the front support bracket 204. Similar to the rail car air brake end hose support assembly 100 described above, assembly 200 may operate to generally constrain the vertical and lateral movement of the portion of the trainline 208 while allowing the longitudinal movement of the portion of the trainline 208 to substantially mimic the longitudinal movement of the coupler (or the Y-47 pin). Thus, the lateral movement of the rail car air brake end hose support assembly 200 is substantially independent of the lateral movement of the coupler 52.

The components of rail car air brake end hose support assembly 200 may be substantially similar to the components of rail car air brake end hose support assembly 100, and are thus, not discussed in detail herein. Rear support bracket 202 may be substantially rigid and may be formed of a metallic material or other suitable material. The rear support bracket 202 may have a top end 210 and a bottom end 212. As shown in FIG. 8A, the rear support 202 may also include one or more supporting brackets 203. Supporting brackets 203 may be connected to the rear support 202 and the tray 206. This may increase the rigidity of the connection between the tray 206 (or portion of the trainline 208) and the rear support 202.

Similar to the embodiment of the assembly 100, the top end 210 or top portion 214 of the rear support bracket 202 may be engaged within the yoke 54. The engagement between the yoke 54 and the rear support bracket 202 may be a substantially rigid engagement and the yoke and the rear support bracket 102 may be removably engaged.

Referring now primarily to FIGS. 7 and 8B the rail car air brake end hose support assembly 200 may include a front support bracket 204. Similar to front support bracket 104, front support bracket 204 may include first and second downward extending arms 230, 232; and a tray opening 234 formed by a first side restraining wall 236, a second side restraining wall 238, an upper restraining wall 240, and a lower restraining wall 242. While front support bracket 104 may form a generally Y-shape or V-shape, front support bracket 204 forms a generally rectangular shape.

The tray 206 may be substantially rigid and may be formed of a metallic material or other suitable material and may generally be similar to tray 106. The tray 206 may be configured to support a rail car air brake end hose or a portion of a trainline 208 that may be engaged with the tray 206. Similar to assembly 100, the tray 206 of assembly 200 may be configured to move laterally, longitudinally, and vertically within the tray opening 234 and in embodiments the lateral, longitudinal, and/or vertical movement of the tray 106 may be restricted or constrained. Thus, as discussed above the portion of the trainline 208 may generally be constrained in the vertical and lateral directions but may move longitudinally to substantially mimic the movement of the coupler 52.

Advantageously, in addition to a reduction in unintended trainline uncouplings, the rail car air brake end hose support assemblies described herein may be easier to install and remove than previous assemblies. Thus, the rail car air brake end hose support assemblies described herein may provide for significant savings in time required to perform maintenance over other previous assemblies. Particularly, the design of the assemblies discussed herein may increase the efficiency and/or ease of installing the Y-47 pin 56 and/or the entire rail car air brake end hose support assembly. Thus, methods of installing the Y-47 pin 56 and the entire rail car air brake end hose support assembly are described herein.

As discussed above, a method for installing a rail car Y-47 pin 56 in a rail car is disclosed. As shown in FIG. 2B, the Y-47 pin 56 has a top end and a bottom end. The Y-47 pin 56 may be inserted into the corresponding aperture in the yoke. Next the top end of the rear support 110 can be engaged with the bottom end of the Y-47 pin 56 and the Y-47 pin 56 can then be pushed upward manually using the rear support 102. While still holding the rear support 102, pin 122 can be inserted to removably engage the rear support bracket 102 to the yoke 54. Advantageously, and as shown in FIG. 2B, the rear support bracket 102 extends below the yoke which allows a user to more easily push the Y-47 pin upward and secure pin 122 while holding the rear support bracket 102 than previous designs.

Once the rear support 102 has been installed, the method for installing a rail car air brake end hose support assembly can then further include engaging the tray 106 with a bottom end 112 of the rear support 102. In some embodiments the tray 106 may be engaged with the rear support 102 prior to engagement of the rear support 102 within the yoke 54.

The method for installing a rail car air brake end hose support assembly may further include engaging the front support bracket 104 with an underside of a rail car 50 and engaging the tray 106 within the front support bracket 104 (or within the opening 134 of the front support bracket 104). As described above, the front support bracket may be adjusted and/or engaged such that the tray 106 is substantially parallel with the ground.

Operating Envelope

As described above, limiting lateral and vertical movement of a rail car air brake end hose support assembly may reduce unintended trainline uncouplings. Additionally, a particular operating envelope for rail car air brake end hose support assemblies has been determined which may reduce unintended trainline uncouplings.

Figure 9:
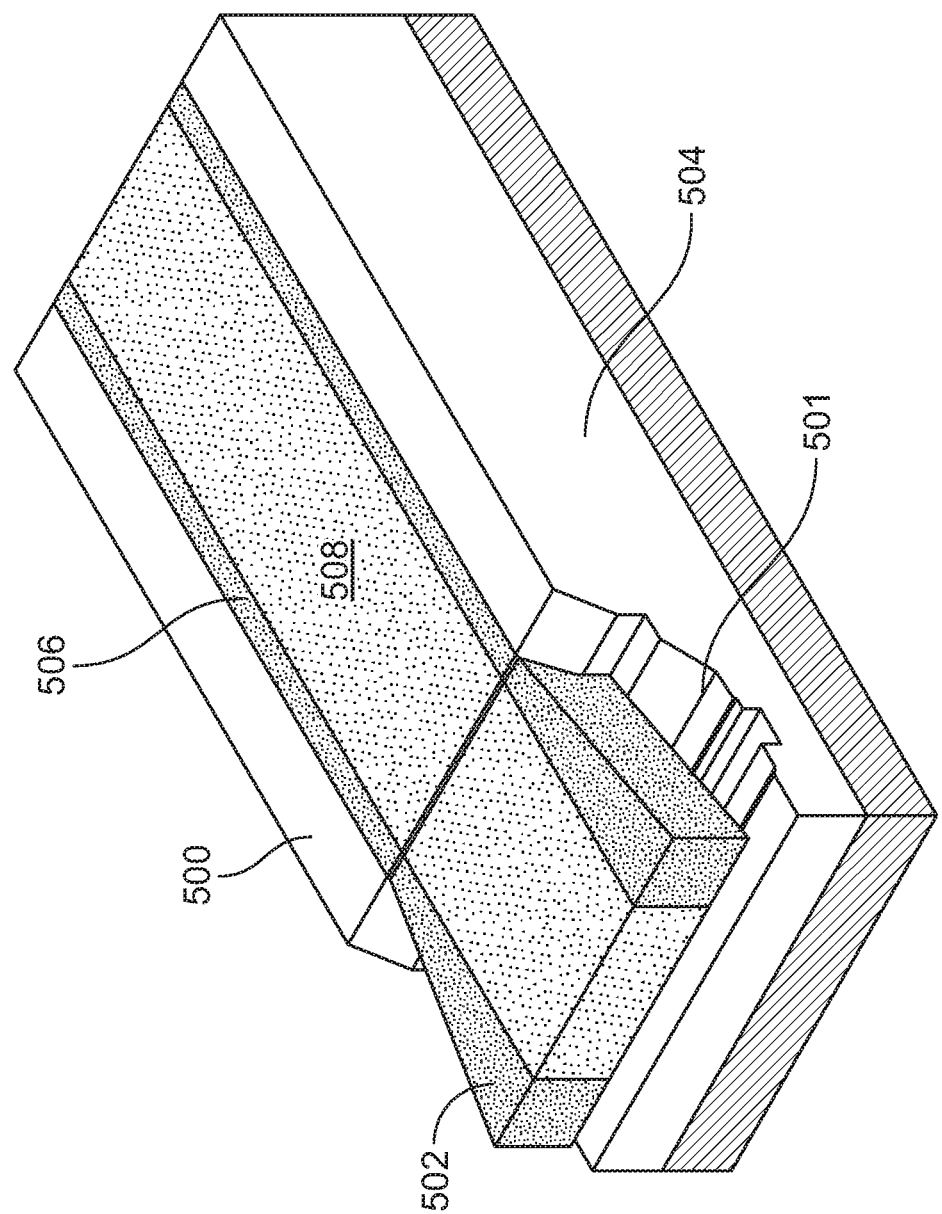
FIG. 9 is a perspective view of an operating envelope for a rail car air brake end hose support assembly according to one or more aspects described herein.

FIG. 9 depicts a perspective view of an operating envelope 500. FIGS. 10A and 10B depict top and side views respectively of the predetermined operating envelope 500 with example dimensions for various portions of the envelop 500 and railcar 50. And FIG. 11 depicts the operating envelope 500 in relation to a rail car 50, and depicts the rail car air brake end hose support assembly 100 within the operating envelope 500 when the coupler is in the buff position. Generally, when the substantially rigid portion of the trainline 108 operates only within this predefined operating envelope 500 when the coupler is in the buff position, the frequency of unintended trainline uncouplings may be reduced.

The operating envelope 500 generally has a cuboidal shape with certain portions 501 removed. These removed portions 501 of the operating envelope are areas in which the substantially rigid portion of the trainline 108 should not operate. Thus, the operating envelope generally has an upper forward tongue portion 502 and a lower base portion 504. Furthermore, within the predefined operating envelope 500 there is preferred operating envelope 506 and optimal operating envelope 508. The preferred operating envelope 506 represents the area in which the substantially rigid portion of the trainline 108 should operate, when the coupler is in the buff position, for a further reduction in unintended trainline uncouplings and the optimal operating envelope 508 represents the area in which the substantially rigid portion of the trainline 108 should operate for the best results or highest reduction in unintended trainline uncouplings.

Generally, in the lateral direction the predefined operating envelope 500 extends 30 inches laterally and is centered on a center of the rail car. In the vertical direction, the predetermined operating envelope 500 extends 18⁹⁄₁₆ inches or less downward from about 17¹³⁄₁₆ below the top of the face of the striker 60. In the longitudinal direction, the predetermined operating envelope 500 extends 68 inches or less backward from the face of the striker.

The preferred operating envelope 506 and optimal operating envelope 508 portions of the predetermined operating envelope 500 may extend 5⁹⁄₁₆ inches or less downward from about 17¹³⁄₁₆ below the top of the face of the striker 60.

The preferred operating envelope 506 may extend 26³⁄₁₆ inches or less laterally and is centered on the center of the rail car; or the preferred operating envelope 506 may extend 18¹³⁄₁₆ inches or less laterally and is centered on the center of the rail car.

The optimal operating envelope 508 may extend 14¹¹⁄₁₆ inches or less laterally and is centered on the center of the rail car.

As described above, when the substantially rigid portion of the trainline 108 operates only within this predefined operating envelope 500 when the coupler is in the buff position, the preferred operating envelope 506, and/or the optimal operating envelope 508 unintended trainline uncouplings may be reduced.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

We claim:

1. A rail car air brake end hose support assembly, the rail car air brake end hose support assembly comprising:
    a rigid, metallic rear support bracket having a top end and a bottom end, the rear support bracket removably, rigidly engaged at a top end within a yoke, the rear support bracket directly supporting a Y-47 pin, the rear support extends upward into a Y-47 pin hole surrounded by the yoke lugs and the rear support bracket extends below the yoke;
a coupler pivotally engaged with the yoke about the Y-47 pin;
a rigid, metallic front support bracket engaged with an underside of a rail car, the front support bracket having a tray opening formed by a first side restraining wall, a second side restraining wall, an upper restraining wall, and a lower restraining wall;
a fixed length, rigid, metallic tray configured to support a rail car air brake end hose, the tray having a first side wall, a second side wall, and a lower wall connecting the first and second side walls and engaged with the lower restraining wall, the tray engaged with the bottom end of the rear support, and the tray movably engaged within the tray opening; and
a portion of a trainline the portion of the trainline having a first connection point and a second connection point, wherein the portion of the trainline is rigidly engaged with the tray, wherein the first connection point and the second connection point are rigidly engaged with the tray, and wherein the portion of the trainline passes through the tray opening;
wherein the portion of a the trainline is engaged with an intermediate flexible hose at the first connection point, wherein intermediate flexible hose is engaged with an angle cock, and wherein the angle cock is substantially longitudinally aligned with an end sill;
wherein the portion of a the trainline is engaged with the rail car air brake end hose at the second connection point, and wherein the rail car air brake end hose is engaged with a glad hand; wherein the first side restraining wall and the second side restraining wall are configured to restrict lateral movement of the tray within the tray opening to less than or equal to 1 inch of lateral movement;
wherein lateral movement of the coupler is substantially independent of lateral movement of the tray;
wherein the top restraining wall and the bottom restraining wall are configured to restrict vertical motion of the tray within the tray opening to less than or equal to 1 inch of vertical movement;
wherein the tray is configured to move longitudinally within the tray opening; and
wherein the longitudinal movement of the tray is substantially similar to the longitudinal movement of the Y-47 pin of the rail car.

2. The rail car air brake end hose support assembly of claim 1, wherein the rear support bracket has a substantially cylindrical cross-section at the top end and a substantially rectangular cross-section at the bottom end.

3. The rail car air brake end hose support assembly of claim 1, wherein the tray is removably engaged with the bottom end of the rear support using mechanical fasteners.

4. The rail car air brake end hose support assembly of claim 1, wherein the portion of the trainline is substantially rigid.

5. The rail car air brake end hose support assembly of claim 4, wherein the portion of the trainline is engaged with the tray using mechanical fasteners.

6. A rail car air brake end hose support assembly, the rail car air brake end hose support assembly comprising:
a rear support bracket having a top end and a bottom end, the rear support bracket configured to be removably, rigidly engaged at a top end within a yoke; and
a substantially rigid portion of a trainline, the portion of the trainline engaged with the rear support bracket;
wherein the lateral movement of the portion of the trainline is constrained;
wherein the vertical movement of the portion trainline is constrained;
wherein the portion of the trainline is configured to move longitudinally substantially similar to the longitudinal movement of a Y-47 pin of a rail car; and
wherein the rear support bracket is configured to support the Y-47 pin.

7. The rail car air brake end hose support assembly of claim 6, wherein the rear support bracket is rigid.

8. The rail car air brake end hose support assembly of claim 6, wherein the rear support bracket is metallic.

9. The rail car air brake end hose support assembly of claim 6, further comprising:
a front support bracket engaged with an underside of the rail car, the front support bracket supporting the portion of the trainline.

10. The rail car air brake end hose support assembly of claim 9, wherein the front support bracket is rigid.

11. The rail car air brake end hose support assembly of claim 9, wherein the front support bracket is metallic.

12. The rail car air brake end hose support assembly of claim 9, wherein the front support bracket is adjustable.

13. The rail car air brake end hose support assembly of claim 9, wherein the front support bracket includes an opening, and wherein the portion of the trainline extends through the opening.

14. The rail car air brake end hose support assembly of claim 13, wherein the opening is formed by a first side restraining wall, a second side restraining wall, an upper restraining wall, and a lower restraining wall;
wherein the first side restraining wall and the second side restraining wall are configured to restrain the lateral movement of the portion of the trainline; and
wherein the upper restraining wall, and a lower restraining wall are configured to restrain the vertical movement of the portion of the trainline.

15. The rail car air brake end hose support assembly of claim 13, further comprising:
a tray, the tray supporting the portion of the trainline; and
wherein the tray is movably engaged within the opening.

16. The rail car air brake end hose support assembly of claim 6, further comprising:
a tray, the tray supporting the portion of the trainline.

17. The rail car air brake end hose support assembly of claim 16, wherein the tray is engaged with the bottom end of the rear support, and wherein the portion of the trainline is engaged with the rear support bracket through the tray.

18. The rail car air brake end hose support assembly of claim 17, wherein the tray is removably engaged with the bottom end of the rear support using mechanical fasteners.

19. The rail car air brake end hose support assembly of claim 18, wherein the tray has a first side wall, a second side wall, and a lower wall connecting the first and second side walls and the lower wall engaged with the lower restraining wall of the rear support bracket.

20. The rail car air brake end hose support assembly of claim 6, wherein lateral movement of the portion of the trainline is restricted to less than 2 inches of movement.

21. The rail car air brake end hose support assembly of claim 6, wherein vertical movement of the portion of the trainline is restricted to less than 2 inches of movement.

22. The rail car air brake end hose support assembly of claim 6, wherein the rear support bracket has a substantially cylindrical cross-section at the top end and a substantially rectangular cross-section at the bottom end.

23. The rail car air brake end hose support assembly of claim 6, wherein the portion of a trainline is engaged with the rail car air brake end hose, wherein the rail car air brake end hose is engaged with glad hand, and wherein a coupler is pivotally engaged with the yoke about the Y-47 pin.

24. A method for installing a rail car air brake end hose support assembly, the method comprising:
   providing a Y-47 pin having a top end and a bottom end, the Y-47 pin configured to be inserted into a rail car yoke;
   providing a rigid, metallic rear support bracket having a top end and a bottom end, the rear support bracket forming a portion of a rail car air brake end hose support assembly;
   inserting the Y-47 pin into the yoke;
   engaging the top end of the rear support bracket with the bottom end of the Y-47 pin and pushing the Y-47 pin upward; and
   removably engaging the rear support bracket with the yoke such that the rear support bracket supports the Y-47 pin;
   wherein the rear support bracket extends below bottom support lugs of the yoke.

25. The method of claim 24, further comprising:
   providing a fixed length, rigid, metallic tray configured to support a rail car air brake end hose, the tray having a first side wall, a second side wall, and a lower wall connecting the first and second side walls and engaged with the lower restraining wall; and
   engaging the tray with the bottom end of the rear support bracket.

26. The method of claim 25, further comprising:
   providing a rigid, adjustable, metallic front support bracket, the front support bracket having a tray opening formed by a first side restraining wall, a second side restraining wall, an upper restraining wall, and a lower restraining wall;
   engaging the front support bracket with an underside of a rail car; and
   engaging the tray with the front support bracket;
   wherein the tray is movably engaged within the tray opening.

27. A method for installing a rail car Y-47 pin in rail car, the method comprising:
   providing a Y-47 pin having a top end and a bottom end, the Y-47 configured to be inserted into a rail car yoke;
   providing a rigid, metallic rear support bracket having a top end and a bottom end;
   inserting the Y-47 pin into the yoke;
   engaging the top end of the rear support bracket with the bottom end of the Y-47 pin and pushing the Y-47 pin upward; and
   removably engaging the rear support bracket with the yoke such that the rear support bracket supports the Y-47 pin;
   wherein the rear support bracket extends below the yoke.

28. The method of claim 27, wherein the rear support bracket forms a portion of a rail car air brake end hose support assembly.

29. The method of claim 28, further comprising:
   providing a tray configured to support a rail car air brake end hose; and
   engaging the tray with a bottom end of the rear support bracket.

30. The method of claim 29, further comprising:
   providing a front support bracket, the front support bracket having an opening; and
   engaging the front support bracket with an underside of a rail car; and
   engaging the tray with the front support bracket;
   wherein the tray is movably engaged within the opening.

31. The method of claim 30 wherein the tray has a first side wall, a second side wall, and a lower wall connecting the first and second side walls and engaged with the lower restraining wall.

32. The method of claim 31, wherein the tray opening is formed by a first side restraining wall, a second side restraining wall, an upper restraining wall, and a lower restraining wall.

33. The method of claim 27, wherein the rear support bracket is engaged with the yoke using a pin.

34. A rail car air brake end hose support assembly, the rail car air brake end hose support assembly comprising:
   a coupler;
   a substantially rigid portion of a trainline, the substantially rigid portion of the trainline movably engaged with the rail car; and
   a striker, the striker having a striker face;
   wherein lateral movement of the coupler is substantially independent of lateral movement of the rail car air brake end hose support assembly;
   wherein the substantially rigid portion of the trainline operates only within a predefined operating envelope when the coupler is in the buff position;
   wherein the predetermined operating envelope extends 30 inches or less laterally and is centered on a center of the rail car;
   wherein the predetermined operating envelope extends $18^{9}/_{16}$ inches or less downward from about $17^{13}/_{16}$ below a top of the face of the striker; and
   wherein the predetermined operating envelope extends 68 inches or less backward from the face of the striker.

35. A rail car air brake end hose support assembly of claim 34, wherein the predetermined operating envelope extends $5^{9}/_{16}$ inches or less downward from about $17^{13}/_{16}$ below the top of the face of the striker.

36. A rail car air brake end hose support assembly of claim 35, wherein the predetermined operating envelope extends $18^{13}/_{16}$ inches or less laterally and is centered on the center of the rail car.

37. A rail car air brake end hose support assembly of claim 35, wherein the predetermined operating envelope extends $14^{11}/_{16}$ inches or less laterally and is centered on the center of the rail car.

38. A rail car air brake end hose support assembly of claim 34, wherein the predetermined operating envelope extends $26^{3}/_{16}$ inches or less laterally and is centered on the center of the rail car.

39. The rail car air brake end hose support assembly of claim 34 further comprising, a rear support bracket, the rear support bracket having a top end and a bottom end, the rear support bracket engaged at a top end within a yoke.

40. The rail car air brake end hose support assembly of claim 39, wherein the rear support bracket supports a Y-47 pin.

41. The rail car air brake end hose support assembly of claim 34, further comprising:
   a front support bracket engaged with an underside of the rail car, the front support bracket supporting the portion of the trainline.

42. The rail car air brake end hose support assembly of claim 41, wherein the front support bracket includes an opening, and wherein the portion of the trainline extends through the opening and is movable within the opening.

43. The rail car air brake end hose support assembly of claim 34, further comprising:
   a tray, the tray supporting the portion of the trainline.

44. The rail car air brake end hose support assembly of claim 34, wherein the lateral movement of the portion of the trainline is constrained;
   wherein the vertical movement of the portion trainline is constrained; and
   wherein the portion of the trainline is configured to move longitudinally substantially similar to the longitudinal movement of a Y-47 pin of the rail car.

45. The rail car air brake end hose support assembly of claim 34, wherein the rail car air brake end hose support assembly reduces unintended trainline uncouplings.

* * * * *